(12) United States Patent
Rao et al.

(10) Patent No.: US 10,700,900 B2
(45) Date of Patent: *Jun. 30, 2020

(54) ELECTRONIC DEVICE, METHOD AND COMPUTER-READABLE MEDIUM FOR SENSING SPECTRUM USAGE IN A COGNITIVE RADIO COMMUNICATION SYSTEM

(71) Applicants: SONY CORPORATION, Minato-ku (JP); Tsinghua University, Beijing (CN)

(72) Inventors: Yu Rao, Beijing (CN); Wei Chen, Beijing (CN); Zhigang Cao, Beijing (CN); Xin Guo, Beijing (CN); Ryo Sawai, Tokyo (JP); Ryota Kimura, Tokyo (JP)

(73) Assignees: Sony Corporation, Tokyo (JP); Tsinghua University, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/022,780

(22) Filed: Jun. 29, 2018

(65) Prior Publication Data

US 2018/0324009 A1   Nov. 8, 2018

Related U.S. Application Data

(63) Continuation of application No. 15/219,765, filed on Jul. 26, 2016, now Pat. No. 10,045,232, which is a
(Continued)

(30) Foreign Application Priority Data

Oct. 14, 2011   (CN) .......................... 2011 1 0323808

(51) Int. Cl.
*H04L 27/00*   (2006.01)
*H04W 16/14*   (2009.01)
(Continued)

(52) U.S. Cl.
CPC ............ *H04L 27/0012* (2013.01); *H04L 5/14* (2013.01); *H04L 5/1469* (2013.01); *H04W 16/14* (2013.01);
(Continued)

(58) Field of Classification Search
CPC ..... H04L 27/0012; H04L 5/14; H04L 5/1469; H04W 16/14; H04W 24/02; H04W 24/10; H04W 52/14
See application file for complete search history.

(56) References Cited

U.S. PATENT DOCUMENTS 5,839,050 A * 11/1998 Baehr ..................... H04B 1/28
                                                            455/2.01
6,493,331 B1 * 12/2002 Walton ................ H04W 52/24
                                                            370/341
(Continued)

FOREIGN PATENT DOCUMENTS

CN   101990231 A   3/2011
CN   102083078 A   6/2011
(Continued)

OTHER PUBLICATIONS

International Search Report dated Jan. 10, 2013, in PCT/CN2012/082487, filed Sep. 29, 2012.

*Primary Examiner* — Chi H Pham
*Assistant Examiner* — Weibin Huang
(74) *Attorney, Agent, or Firm* — Xsensus LLP

(57) ABSTRACT

The disclosure provides an electronic device, a method and computer-readable medium. The electronic device includes a circuitry. The circuitry is configured to receive a radio communication signal for another device. The circuitry is also configured to determine, based on the radio communication signal, one or more features that can reflect the difference between uplink transmission mode and downlink transmission mode. The circuitry is further configured to
(Continued)

judge whether the radio communication signal is for uplink transmission or downlink transmission according to the feature(s).

18 Claims, 10 Drawing Sheets

Related U.S. Application Data continuation of application No. 14/349,212, filed as application No. PCT/CN2012/082487 on Sep. 29, 2012, now Pat. No. 9,445,287.

(51) Int. Cl.
    *H04L 5/14*     (2006.01)
    *H04W 24/02*     (2009.01)
    *H04W 24/10*     (2009.01)
    *H04W 52/14*     (2009.01)

(52) U.S. Cl.
    CPC .......... *H04W 24/02* (2013.01); *H04W 24/10* (2013.01); *H04W 52/14* (2013.01); *H04L 27/0006* (2013.01)

(56) References Cited

U.S. PATENT DOCUMENTS

| | | | |
|---|---|---|---|
| 8,805,428 B2* | 8/2014 | Lang | H04L 27/0006 455/446 |
| 10,045,232 B2* | 8/2018 | Rao | H04W 16/14 |
| 2004/0192279 A1* | 9/2004 | Backes | H04L 47/125 455/418 |
| 2006/0037059 A1* | 2/2006 | Jin | H04N 5/4401 725/118 |
| 2006/0045525 A1 | 3/2006 | Lee | |
| 2008/0013517 A1 | 1/2008 | Buchwald et al. | |
| 2010/0027493 A1* | 2/2010 | Dinulescu | H04W 72/02 370/329 |
| 2010/0311341 A1 | 12/2010 | Gaddam | |
| 2011/0299511 A1 | 12/2011 | Cook | |
| 2012/0195212 A1* | 8/2012 | Zhang | H04W 72/1215 370/252 |
| 2012/0219095 A1* | 8/2012 | Pitkanen | H04L 1/0038 375/340 |
| 2014/0233438 A1 | 8/2014 | Rao | |
| 2015/0365880 A1 | 12/2015 | Malladi | |
| 2016/0007378 A1 | 1/2016 | Bertorelle | |
| 2016/0227427 A1* | 8/2016 | Vajapeyam | H04W 72/085 |
| 2016/0227578 A1 | 8/2016 | Lee | |
| 2017/0048891 A1 | 2/2017 | Quan | |
| 2017/0195955 A1* | 7/2017 | Ryoo | H04W 4/08 |
| 2017/0294993 A1* | 10/2017 | Sandhya | H04W 74/0825 |

FOREIGN PATENT DOCUMENTS

| | | |
|---|---|---|
| EP | 2 273 699 A1 | 1/2011 |
| JP | 2002-186020 A | 6/2002 |
| JP | 2011-512077 A | 4/2011 |
| JP | 2011-172019 | 9/2011 |
| JP | 2012-507244 | 3/2012 |
| WO | WO 2009/095369 A1 | 8/2009 |
| WO | 2010/062631 | 6/2010 |
| WO | WO 2010/062631 A2 | 6/2010 |

* cited by examiner

ELECTRONIC DEVICE, METHOD AND COMPUTER-READABLE MEDIUM FOR SENSING SPECTRUM USAGE IN A COGNITIVE RADIO COMMUNICATION SYSTEM

CROSS-REFERENCE TO RELATED APPLICATIONS

This application is a continuation of and is based upon and claims the benefit of priority under 35 U.S.C. § 120 from U.S. patent application Ser. No. 15/219,765, filed Jul. 26, 2016, which is a continuation of U.S. patent application Ser. No. 14/349,212, filed Apr. 2, 2014, which is a National Stage Application of PCT/CN2012/082487, filed Sep. 29, 2012, and claims the benefit of priority under 35 U.S.C. § 119 of Chinese Patent Application No. 201110323808.X, filed Oct. 14, 2011; the entire contents of each of which are incorporated herein by reference.

FIELD OF THE INVENTION

The disclosure relates to the field of communication, and particularly to a cognitive radio communication system, an apparatus and a method used therein.

BACKGROUND OF THE INVENTION

Under a scenario of cognitive radio (CR), in order to allow a secondary system (SS) without a licensed spectrum to have an opportunity to access a licensed spectrum of a primary system (PS), the primary system needs to have a capability of discovering a spectrum usage. A user in the primary system (which is referred to as a secondary user (SU)) senses the spectrum being used by the primary system, judges whether there is a primary user (PU) (i.e., a user in the primary system) signal, and decides how to use the spectrum of the primary system without interfering the PU.

SUMMARY OF THE INVENTION

The inventor of the present disclosure finds that: under certain scenario such as a cognitive radio scenario, a secondary system needs to know about uplink/downlink configuration for a channel resource in a primary system (i.e., whether each channel resource is used for uplink transmission or downlink transmission) first, as the basis for subsequent spectrum sensing and interference control. For example, taking a case that the primary system is a communication system based on time division transmission (such as a time division duplex (TDD) communication system) as an example, transmission of an uplink channel resource and transmission of a downlink channel resource thereof are performed alternatively in a time scale. The minimum duration for uplink/downlink transmission is generally referred to as a sub-frame. That is, under the cognitive radio scenario, a secondary user needs to know about an uplink/downlink type of each sub-frame. In addition, in the TDD system, several uplink/downlink sub-frames are combined into a frame, and the combination of the uplink/downlink sub-frames in each frame is referred to as an uplink/downlink configuration. Generally, there can be many types of the uplink/downlink configurations (which is referred to as "frame configuration"), and configurations of these types are illustrated in detail in related communication standards.

In the prior art, it is generally assumed that the secondary system has already know about the uplink/downlink configuration for a channel resource in the primary system. For example, it is generally assumed that the secondary system acquires uplink/downlink configuration information of the channel resource in the primary system by performing information interaction with the primary system. However, this does not coincide with the requirements that the primary system cannot change its system setting and the secondary system is transparent to the primary system under the cognitive radio scenario. In addition, in a case that the primary system may actively transmit its channel resource configuration information to the secondary system, there may be a selfish behavior that the primary system deliberately transmits error information to prevent the secondary system from using the spectrum of the primary system.

Some embodiments of the disclosure provide an apparatus and a method used in a cognitive radio system (i.e., a secondary system), with the apparatus or the method, the secondary system can acquire uplink/downlink configuration information of the channel resource in the primary system without performing information interaction with the primary system, thereby ensuring correctness of the information acquired by the secondary system.

A brief summary regarding the disclosure is given hereinafter, to provide basic understanding about some aspects of the disclosure. It should be understood that, this summary is not an exhaustive summary about the disclosure. This summary neither intends to determine a critical or important part of the disclosure, nor intends to limit the scope of the disclosure. The summary only aims at giving some concepts in a simplified form as a preamble for description discussed later in more detail.

According to one aspect of the disclosure, an apparatus used in a cognitive radio communication system is provided. The apparatus may include a receiving device, a feature extracting device, and an uplink/downlink judging device. The receiving device is adapted to receive a communication signal between apparatuses in another radio communication system. The feature extracting device is adapted to extract, from the communication signal, one or more features that can reflect the difference between an uplink transmission mode and a downlink transmission mode of the another radio communication system. The uplink/downlink judging device is adapted to judge whether a channel resource occupied by the communication signal is used for uplink transmission or downlink transmission according to the feature(s).

According to another aspect of the disclosure, a cognitive radio system is provided, which may include the above apparatus. The above apparatus may be equipped in a user apparatus in the cognitive radio system, or in a base station in the cognitive radio system.

According to yet another aspect of the disclosure, a method used in a cognitive radio communication system is provided. According to the method, a communication signal between apparatuses in another radio communication system is received. One or more features that can reflect the difference between an uplink transmission mode and a downlink transmission mode of the another radio communication system are extracted from the communication signal. A judgment is made as to whether a channel resource occupied by the communication signal is used for uplink transmission or downlink transmission according to the feature(s).

According to yet another aspect of the disclosure, an electronic device is provided. The electronic device may include a circuitry. The circuitry is configured to receive a radio communication signal for another device. The circuitry is also configured to determine, based on the radio communication signal, one or more features that can reflect the difference between uplink transmission mode and downlink transmission mode. The circuitry is further configured to judge whether the radio communication signal is for uplink transmission or downlink transmission according to the feature(s).

According to yet another aspect of the disclosure, a method used in a radio communication system is provided. According to the method, a radio communication signal for another device is received by a circuitry. One or more features that can reflect the difference between uplink transmission mode and downlink transmission mode are determined by the circuitry based on the communication signal. A judgment as to whether the radio communication signal is for uplink transmission or downlink transmission is made by the circuitry according to the feature(s).

According to yet another aspect of the disclosure, a non-transitory computer-readable medium is provided. The non-transitory computer-readable medium is encoded with computer-readable instructions thereon, the computer-readable instructions, when executed by a computer, cause the computer to perform a method. According to the method, a radio communication signal for another device is received. One or more features that can reflect the difference between uplink transmission mode and downlink transmission mode are determined based on the communication signal. A judgment as to whether the radio communication signal is for uplink transmission or downlink transmission is made according to the feature(s).

In addition, an embodiment of the disclosure further provides a computer program for implementing the above method.

Further, an embodiment of the disclosure further provides a computer program product which is at least in the form of a computer readable medium, with a computer program code recorded thereon for implementing the above method.

BRIEF DESCRIPTION OF THE DRAWINGS

Referring to the following illustration of embodiments of the disclosure that is made in conjunction with the accompanying drawings, it will be easier to understand the above and other objectives, characteristics and advantages of the disclosure. Components in the accompanying drawings are just used to illustrate the principle of the disclosure. In the accompanying drawings, same or similar reference numbers are used to indicate same or similar technical characteristics or components.

DETAILED DESCRIPTION OF THE INVENTION

Embodiments of the disclosure are illustrated hereinafter in conjunction with the accompanying drawings. Elements and features described in one accompanying drawing or one embodiment of the disclosure may be combined with elements and features shown in one or more other accompanying drawings or embodiments. It should be noted that, for the purpose of clarity, representation and description of components and processing which are unrelated with the disclosure and have been known by those skilled in the art are omitted in the accompanying drawings an the specification.

Embodiments of the disclosure provide an apparatus and a method used in a cognitive radio system (which is also referred to as a secondary system), so that the secondary system can acquire uplink/downlink configuration information of a channel resource in another radio communication without performing information interaction with that system. In the disclosure, the another radio communication system may also be referred to as a primary system, which may be any communication system applicable for a cognitive radio scenario, for example, a radio communication system based on time division transmission (such as a TDD communication system), which is not enumerated here.

Figure 1:
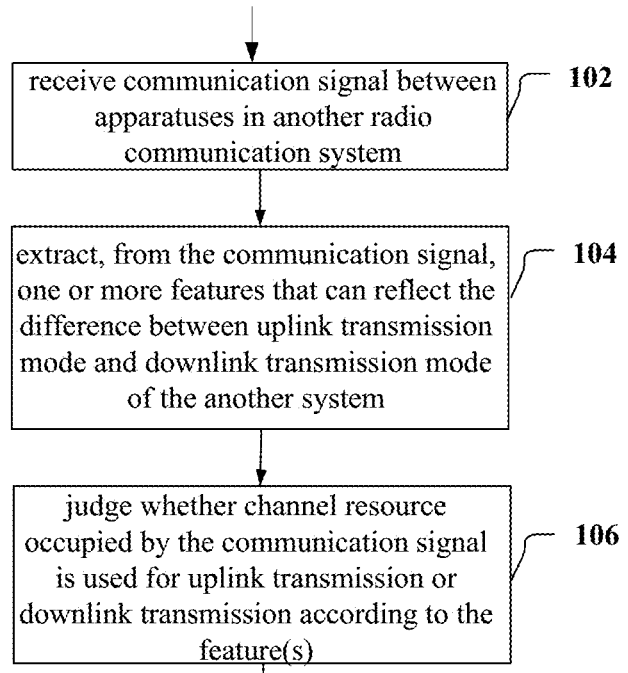
FIG. 1 is a schematic flow chart of a method used in a cognitive radio system according to an embodiment of the disclosure.

FIG. 1 is a schematic flow chart of a method used in a cognitive radio system according to an embodiment of the disclosure. In this method, an apparatus in the secondary system judges the uplink/downlink configuration of a channel resource in the primary system according to transmission feature(s) of a communication signal in the primary system.

As shown in FIG. 1, the method may include steps 102, 104 and 106.

At step 102, an apparatus in the secondary system receives a communication signal between apparatuses in the primary system. Here, the apparatus in the secondary system may be a user apparatus in the secondary system (which is also referred to as a secondary user), and may also be a base station apparatus in the secondary system.

At step 104, the apparatus in the secondary system extracts one or more features from the received communication signal. The extracted features may be any feature of an uplink/downlink communication signal in the primary system which can reflect the difference between an uplink transmission mode and a downlink transmission mode of the primary system. Thus, at step 106, the apparatus in the second system may judge whether a channel resource occupied by the received communication signal of the primary system is used for uplink transmission or downlink transmission, according to the extracted features. In other words, the apparatus in the secondary system can know about uplink/downlink configuration for the channel resource in the primary system by analyzing the received communication signal of the primary system.

The inventor of the disclosure finds that, in different communication systems, there may be some significant differences between an uplink communication signal and a downlink communication signal. For example, the transmission powers adopted in an uplink signal and a downlink signal are different. Typically, the transmission power of the downlink signal is significantly higher than that of the uplink signal. In this case, the apparatus in the secondary system may extract, from the communication signal of the primary system, a feature capable of reflecting the transmission power of the communication signal, thereby judge whether the channel resource occupied by the communication signal is used for the uplink transmission or the downlink transmission. The apparatus in the secondary system may extract, from the communication signal, the feature reflecting the transmission power of the communication signal with any suitable method, for example, an energy detection method described later with reference to FIG. 2 or Formulas (1) to (3), which is not illustrated here in detail.

As another example, in some communication systems, the modulation modes adopted for the uplink signal and the downlink signal are different. Therefore, the apparatus in the secondary system may extract, from the communication signal of the primary system, a feature capable of reflecting the modulation mode for the communication signal as the feature. Any suitable method may be adopted to extract, from the communication signal, the feature reflecting the modulation mode for the communication signal, for example, a wavelet transform algorithm for recognizing the modulation mode or the like may be utilized to extract the feature reflecting the modulation mode, which is not illustrated here in detail.

As another example, in some communication systems, the peak-to-average ratio of the uplink signal is different from that of the downlink signal. In this case, the apparatus in the secondary system may calculate a peak-to-average ratio according to the communication signal of the primary system as the feature, to judge whether the channel resource occupied by the communication signal is used for the uplink transmission or the downlink transmission.

In a specific embodiment, the apparatus in the secondary system may extract, from the communication signal of the primary system, any one of a feature reflecting the transmission power, a feature reflecting the modulation mode or a peak-to-average ratio, as the feature. As an another specific embodiment, the apparatus in the secondary system may extract two or more of the above features from the communication signal of the primary system, and utilize the extracted two or more features to judge whether the channel resource occupied by the communication signal is used for the uplink transmission or the downlink transmission, thereby making subsequent judgment result more accurate.

In addition, it should be understood that, the features described above are exemplary but not exhaustive. Any other feature capable of reflecting the difference between the uplink transmission mode and the downlink transmission mode for the primary system may be adopted, which is not limited to the features listed above.

In the method described above with reference to FIG. 1, the apparatus in the secondary system judges the uplink/downlink configuration for the channel resource in the primary system by utilizing the received communication signal from the primary system. With this method, there is no need for the apparatus in the secondary system to perform information interaction with an apparatus in the primary system, therefore, there is no need for the primary system to change its system configuration, which can better meet the requirement that the secondary system is transparent to the primary system under the cognitive radio scenario.

Some specific embodiments according to the disclosure will be described in the following.

Figure 2:
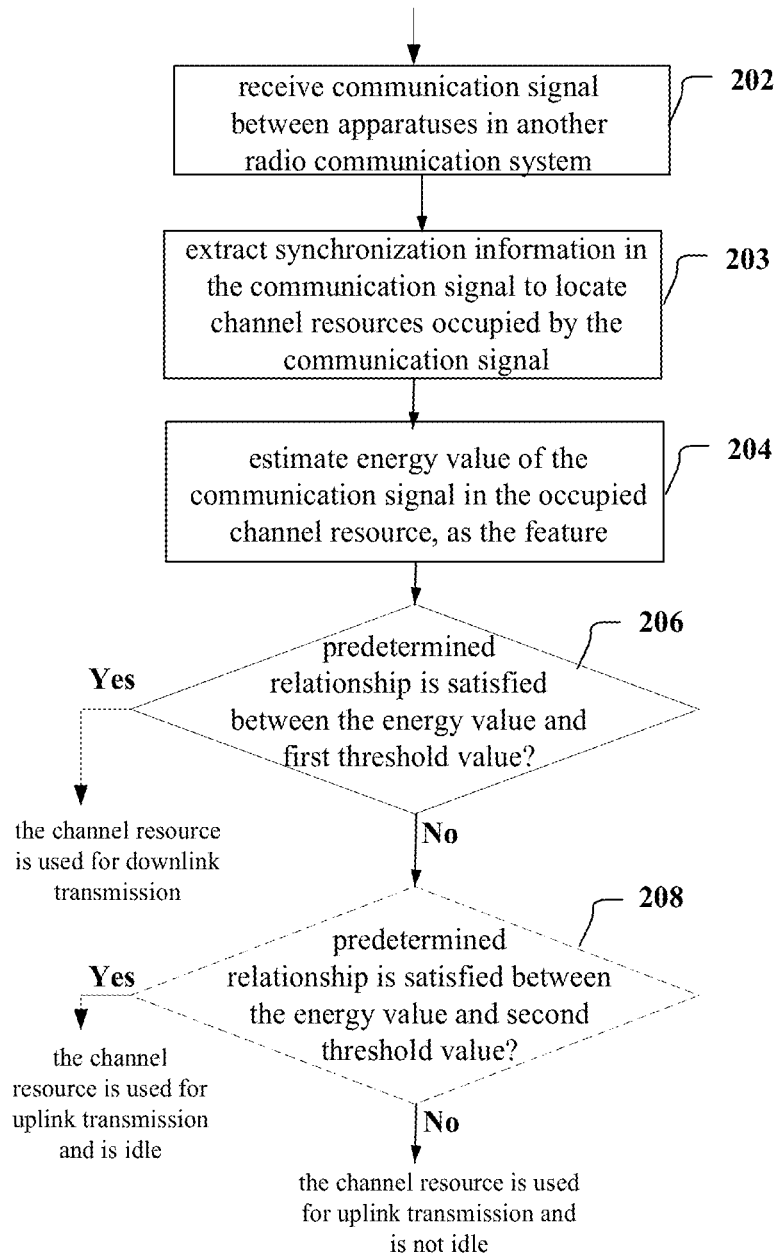
FIG. 2 is a schematic flow chart of a method used in a cognitive radio system according to a specific embodiment.

FIG. 2 shows a specific embodiment of a method used in a cognitive radio system according to the disclosure. In the specific embodiment, the apparatus in the secondary system may extract, from the communication signal of the primary system, a feature reflecting the transmission power of the communication signal, for judging the uplink/downlink configuration for the channel resource in the primary system.

As shown in FIG. 2, at step 202, the apparatus in the secondary system receives a communication signal between apparatuses in the primary system. Then, at step 203, the apparatus in the secondary system may extract synchronization information in the received communication signal to locate channel resources occupied by the communication signal. Taking a case that the primary system is a communication system based on time division transmission as an example, after receiving the communication signal of the primary system, the apparatus in the secondary system may first locate a sub-frame header and a frame header. Here, the frame and the sub-frame are the channel resources, the sub-frame header and the frame header respectively indicate a boundary between sub-frames and a boundary between frames, and locating the channel resources means locating the boundaries between the frames and boundaries between the sub-frames. Here, the secondary system needs to have priori knowledge about definition for a synchronization signal and definition for synchronous timing in related communication standards of the primary system. These priori knowledge may be pre-stored in a storage device (not shown in the figure) of the apparatus in the secondary system. The secondary system may utilize the synchronization signal defined in the communication standard of the primary system to perform circular correlation detection with a primary user signal, and locate the starting time of each sub-frame and the staring time of each frame in combination with the synchronous timing defined in the communication standard. It can be understood by those skilled in the art, any suitable method may be adopted to perform the circular correlation detection, which is not illustrated here in detail. In addition to the above priori knowledge, other priori knowledge is not needed by the apparatus in the secondary system in performing the circular correlation detection. Generally, only several radio frames are needed for the apparatus in the secondary system to implement a synchronizing process of the sub-frames and frames. The locating process of the sub-frame headers and the frame headers are similar to the synchronizing processes in initialization of the primary system, which are not illustrated here in detail.

Then, at step 204, the apparatus in the secondary system may estimate the energy value of the communication signal in the channel resource it occupied in the primary system, as the feature for judging the uplink/downlink configuration for the channel resource. Any suitable method may be adopted to estimate the energy value of the communication signal (for example, an example described later with reference to Formulas (1) to (3)) as the feature reflecting the transmission power of the communication signal, which is not illustrated here in detail. Subsequently, at step 206, the apparatus in the secondary system judges whether a predetermined relationship is satisfied between the estimated energy value and a predetermined threshold value (which is referred to as a first threshold value), and if yes, then judges that the channel resource is used for the downlink transmission; otherwise, judges that the channel resource is used for the uplink transmission. Generally, the downlink transmission generally adopts constant power; and for the uplink transmission, since the number of the primary users, the number of allocated sub-carriers, the allocated power and the like are different, the magnitudes of uplink transmission power are different. However, the downlink transmission power is always much larger than the uplink transmission power. In order to distinguish the downlink transmission and the uplink transmission, an extreme case that the transmission power of the uplink transmission is maximum (i.e., a case that all sub-carriers are allocated) need to be considered, to more accurately distinguish the uplink transmission and the downlink transmission. Therefore, the apparatus in the secondary system may set the first threshold value according to the downlink transmission power and the maximum uplink transmission power of the primary system. For example, any value between the downlink transmission power and the maximum uplink transmission power (such as an average value thereof or a mid-value therebetween) may be set as the first threshold value. When the estimated energy value is larger than the first threshold value, it can be judged that the channel resource is used for the downlink transmission; otherwise, it can be judged that the channel resource is used for the uplink transmission. It should be understood that, in different application scenarios, the downlink transmission power as well as the maximum uplink transmission power of the primary system may be different, therefore, the specific value of the predetermined threshold value is not specifically defined here. In addition, information about the downlink transmission power and the maximum uplink transmission power of the primary system and the like may be stored, as the priori knowledge, in a storage device (which is not shown in the figure) of the apparatus in the secondary system or in a storage device which is separate from the apparatus in the secondary system but accessible by the apparatus in the secondary system, which is not described here in detail.

In the specific embodiment described above, the apparatus in the secondary system judges the uplink/downlink configuration for the channel resource in the primary system by utilizing the difference between the uplink transmission power and the downlink transmission power. In addition to the downlink transmission power and the maximum uplink transmission power of the primary system, the secondary system does not need to acquire other priori knowledge about the primary system for judging the uplink/downlink configuration, thereby facilitating the deployment of the secondary system.

Optionally, after the apparatus in the secondary system estimates the energy value of the communication signal in the channel resource it occupied in the primary system and judges that the channel resource is used for the uplink transmission by utilizing the estimated energy value, the apparatus in the secondary system may further judge whether the uplink channel resource is idle (such as the step shown in the dashed line block 208 in FIG. 2).

Figure 3:
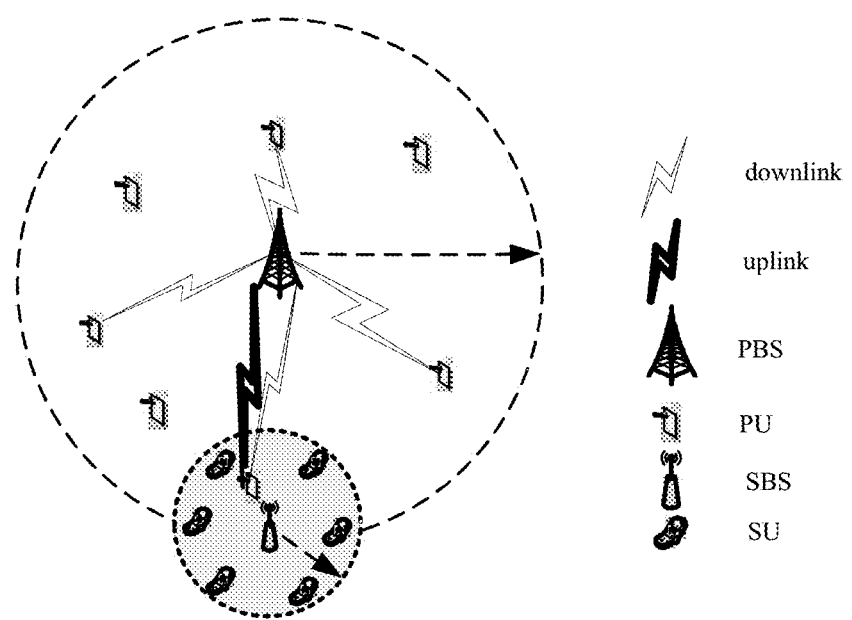
FIG. 3 is a schematic diagram illustrating an application scenario applicable for the disclosure.

Taking the application scenario shown in FIG. 3 as an example, it is assumed that the primary system is a communication system based on time division transmission. As shown in FIG. 3, it is assumed that there is one primary system (PS) and one secondary system (SS) in the application scenario. The primary system includes one primary base station (PSB) and $n_{pu}$ primary users (PU), and the secondary system includes one secondary base station (SBS) and $n_{su}$ secondary users (SU). The secondary system tries to use a channel resource in the primary system that is close to the secondary system. Here, it is assumed that the secondary system is at the edge of the primary system cell, the primary users are randomly distributed within the primary system having a cell radius of $R_{ps}$, and the secondary users are randomly distributed within the secondary system having a cell radius of $R_{ss}$.

It is assumed that the primary system is a communication system adopting TD-LTE (Time Division Long Term Evolution) standard, and 10 sub-frames are included in each frame, i.e., $n_{sf}=10$. The apparatus in the secondary system needs to detect the uplink/downlink configurations for the 10 sub-frames in each frame, that is, judge whether each sub-frame in the frame is used for uplink transmission or downlink transmission. As a specific example, the apparatus in the secondary system may estimate an energy value of each received sub-frame with an energy detection method. In this instance, a method that performs Fast Fourier Transform (FFT) on the received communication signal is used to acquire a sample of each symbol on a sub-carrier. Assuming that $n_{id}$ secondary users detect the uplink/downlink configuration for each sub-frame simultaneously, and $s_i[l, k]$ ($1 \leq i \leq n_{id}$) is the sample of an l-th symbol on a k-th sub-carrier that is received by an i-th secondary user (which is indicated as $su_i$), then the following formula may be obtained:

$$s_i[l, k] = \begin{cases} h_i^{(d)}[l,k]s^{(d)}[l,k] + n_i[l,k], & \text{downlink sub-carrier} \\ h_i^{(u)}[l,k]s^{(u)}[l,k] + n_i[l,k], & \text{uplink sub-carrier (occupied)} \\ n_i[l,k], & \text{uplink sub-carrier (un-occupied)} \end{cases} \quad (1)$$

In the above formula, $s^{(d)}[l, k]$ and $s^{(u)}[l, k]$ respectively indicate transmitted samples of the l-th symbol on the k-th sub-carrier for a downlink signal and an uplink signal, $n_i[l, k]$ indicates a noise sample received by $su_i$, $h_i^{(u)}[l, k]$ indicates a channel gain between a transmitter corresponding the uplink signal and $su_i$, and $h_i^{(d)}[l, k]$ indicates a channel gain between a transmitter corresponding the downlink signal and $su_i$. Three states of the signal shown in Formula (1) indicate downlink transmission (which is always present on each useful sub-carrier), uplink transmission (the uplink sub-carrier is occupied by the primary user) and uplink but idle (that is, the sub-carrier is not occupied by the primary user, and only an environmental noise is present), respectively.

The secondary user may accumulate energy of the first $n_s$ symbols of each sub-frame, and calculate an average value thereof as an energy estimation value $T_i$ of each sub-frame, that is:

$$T_i = \frac{1}{n_s N_{sc}} \sum_{k=1}^{n_s} \sum_{l=1}^{N_{sc}} |s_i[l,k]|^2 \quad (2)$$

In Formula (2), $N_{sc}$ is the number of sub-carriers used in energy detection. In order to reduce the number of the symbols used in detection, it may be assumed that $N_{sc}$ is the number of all sub-carriers in a frequency band of the primary system. As described above, the downlink transmission of the primary system are always performed with constant power; and for the uplink transmission, since the number of the primary users, the number of the allocated sub-carriers, the allocated power and the like are different, the total power of the uplink transmission is different. In order to distinguish the downlink transmission and the uplink transmission, an extreme case that the transmission power of the uplink transmission is maximum (i.e., a case that all sub-carriers are allocated) needs to be considered, to more accurately distinguish the uplink transmission and the downlink transmission. The following formula may be obtained by combining the formulas (1) and (2):

$$T_i = \begin{cases} \frac{1}{n_s N_{sc}} \sum_{k=1}^{n_s} \sum_{l=1}^{N_{sc}} \{|h_i^{(d)}[l,k] s^{(d)}[l,k]|^2 + |n_i[l,k]|^2\} & \text{downlink} \\ \frac{1}{n_s N_{sc}} \sum_{k=1}^{n_s} \sum_{l=1}^{N_{sc}} \{|h_i^{(u)}[l,k] s^{(u)}[l,k]|^2 + |n_i[l,k]|^2\} & \text{uplink} \\ \frac{1}{n_s N_{sc}} \sum_{k=1}^{n_s} \sum_{l=1}^{N_{sc}} |n_i[l,k]|^2 & \text{uplink but idle} \end{cases} \quad (3)$$

In Formula (3), "downlink" indicates the downlink transmission (which is always present on each useful sub-carrier), "uplink" indicates the uplink transmission ((the uplink sub-carrier is occupied by the primary user), and "uplink but idle" indicates the uplink but idle state (i.e., the sub-carrier is not occupied by the primary user, and only an environmental noise is present). It is assumed that the three states are respectively indicated as $\mathcal{H}_d$, $\mathcal{H}_u$ and $\mathcal{H}_i$, in which both $\mathcal{H}_u$ and $\mathcal{H}_i$ are in the uplink transmission state.

The above formula can show that the three states may be distinguished according to the magnitude of the estimated energy values, thereby judging the uplink/downlink configuration for the channel resource. Specifically, a value between the downlink transmission power and the maximum uplink transmission power of the primary system may be used as the first threshold value for distinguishing the uplink transmission and the downlink transmission (as described above with reference to step 204). In addition, after it is judged that the channel resource (such as each sub-frame) is used for the uplink transmission, any suitable value between the uplink transmission power of the primary system and an environment background noise statistic (it should be understood by those skilled in the art that, any suitable method may be used to obtain the environment background noise statistic, which is not described here in detail) as a second threshold value. The apparatus in the secondary system may further judge whether a predetermined relationship is satisfied between the estimated energy value and the second threshold value, and if it is judged that the predetermined relationship is satisfied between the estimated energy value and the second threshold value, then it is judged that the channel resource is idle. For example, if the estimated energy value is less than or equal to the second threshold value, then it is judged that the channel resource is idle; otherwise, it is judged that the channel resource is not idle.

Still taking the application scenario shown in FIG. 3 as an example, a specific example for determining the first threshold value and the second threshold value will be described in the following.

As described above, the $\mathcal{H}_i$ state only includes complex noise signals on the $N_{sc}$ sub-carriers. Assuming that $N_d$ indicates noise power spectral density of a primary system channel, and $B_s$ indicates bandwidth of each sub-carrier, then $\text{Var}_n = N_{sc} N_d B_S$ is noise power of the primary system channel. It is assumed that $T_{th}^l$ indicates the second threshold value, then $T_{th}^i$ may be set as a value which is only related to the noise to distinguish the $\mathcal{H}_u$ and $\mathcal{H}_i$ states of the uplink channel resource. According to an energy detection theory, the threshold value may be set as:

$$T_{th}^l = \text{Var}_n \left(1 + \frac{Q^{-1}(p_f^i)}{\sqrt{n_s N_{sc}/2}}\right) \quad (4)$$

In the above formula, $p_f^i$ indicates the probability that the detection statistic is larger than $T_{th}^l$, i.e., the probability that the $\mathcal{H}_i$ state is detected as the $\mathcal{H}_u$ or $\mathcal{H}_d$ state by mistake, and $Q^{-1}(.)$ indicates an inverse Q function. Any suitable method may be adopted to determine the probability $p_f^i$, for example, the probability may be predetermined as a small probability, such as 10% or a value less than 10%, which is not described here in detail.

In addition, it is assumed that the first threshold is indicated as $T_{th}^h$. The first threshold value $T_{th}^h$ is larger than the second threshold value, which may be set with reference to the definition related to the uplink transmission power and downlink transmission power in the communication standards of the primary system as described above. As an example, $T_{th}^h$ may be less than the average received power of a downlink signal, and larger than the average received power of an uplink signal. As another example, $T_{th}^h$ may be set according to a mid-value between the average received power that a receiver in the secondary system receives the uplink signal and the average received power that the receiver in the secondary system receives the downlink signal. As another example, $T_{th}^h$ may be set from the perspective of error detection probability. A $T_{th}^h$ determination method based on the error detection probability is illustrated hereinafter in detail.

As described above, the base station in the primary system always performs the downlink transmission with constant power $P_d$, whereas the transmission power of each primary user is related to the power allocated thereto. Therefore, when all the primary users perform the uplink transmission with the maximum power, an uplink communication signal and a downlink communication signal of the primary system are most likely to be confused with each other. Therefore, the first threshold value $T_{th}^h$ may be set according to the maximum uplink total power and the downlink total power. It is assumed that $P_u^{max}$ indicates uplink maximum total transmission power, then $P_u^{max} = n_{pu}^{max} P_{pu}^{max}$, where $n_{pu}^{max}$ indicates the maximum number of the primary users supported by the primary system, and $p_{pu}^{max}$ indicates maximum transmission power of each primary user in the primary system. Since the primary users and the secondary users are randomly distributed within a certain region, each secondary user may receive a different average energy value of the uplink signal and a different average energy value of the downlink signal. The first threshold value may be set by considering an average case, that is, assuming that the primary user and the secondary user are respectively located at the centre of the primary system and the centre of the secondary system, then the first threshold value $T_{th}^h$ may be defined as follows:

$$T_{th}^h = (\text{Var}_n + PL_{R_{ps}} P_{u_{max}})\left(1 + \frac{Q^{-1}(\hat{p}_f^u)}{\sqrt{n_s N_{sc}/2}}\right) \quad (5)$$

In the above formula, $PL_{R_{ps}}$ indicates path loss from the centre of the primary system to the centre of the secondary system (i.e., the edge of the primary system), and $p_f^{\hat{u}}$ indicates the referred probability that the $\mathcal{H}_u$ state is detected as the $\mathcal{H}_d$ state by mistake, it should be noted that the probability $p_f^{\hat{u}}$ is not an actual probability but a reference value.

Any suitable method may be adopted to determine the probability $p_f^{\hat{u}}$, for example, the probability may be predetermined as a small probability, such as 10% or a value less than 10%, which is not described here in detail. The probability $p_m^{\hat{d}}$ that the $\mathcal{H}_d$ state is detected as the $\mathcal{H}_u$ state by mistake may be determined with the following formula:

$$\hat{p}_m^d = 1 - Q\left(\frac{Q^{-1}(\hat{p}_f^u) - \lambda_{d-u}\sqrt{n_s N_{sc}/2}}{1 + \lambda_{d-u}}\right) \quad (6)$$

Wherein $\lambda_{d-u}$ indicates a signal-to-noise ratio of the downlink signal to the uplink signal, i.e., $$\lambda_{d-u} = \frac{P_d PL_{R_{ps}} + \text{Var}_n}{P_{u_{max}} PL_{R_{ps}} + \text{Var}_n} - 1 \quad (7)$$

The above Formula (4) shows that the second threshold value $T_{th}^l$ is related to the noise power on the frequency band of the primary system (PS), but unrelated to signal features of the primary system. Compared with the second threshold value $T_{th}^l$, the setting for the first threshold value $T_{th}^h$ is relatively complicated.

Other specific examples for determining the first threshold value $T_{th}^h$ in some specific application scenarios will be described hereinafter.

For example, the first threshold value may be determined according to whether the secondary system can acquire information about relative positions (such as distances between respective nodes) between all transceivers (i.e., all nodes) in the primary system and the secondary system. For example, if the secondary system can know about the relative position information (i.e., a case that the relative positions between respective nodes can be located), then the secondary system may estimate accuracy of the uplink/downlink detection, thereby accurately setting the first threshold value according to the accuracy. Alternatively, if the secondary can know about a maximum value or a minimum value of the relative position information, the secondary system may estimate a maximum value or a minimum value of the uplink/downlink detection accuracy, and calculate a feasible search interval of the first threshold value, thereby searching a suitable value within the search interval as the first threshold value. And if the secondary system can not know about the relative position information (i.e., a case that the relative positions between respective nodes can not be located), the first threshold value may be set according to the maximum uplink transmission power and the downlink transmission power of the primary system as described above.

As a specific example, assuming that the secondary system is located in a single primary system cell and the secondary system can know about distances between all transceivers in the primary system and the secondary system (i.e., all nodes in the primary system and the secondary system) (the secondary base station may adopt any suitable method to locate the relative positions between all nodes, which is not defined and described here in detail).

In a case of the single primary system cell, the secondary system is commonly located at the edge of the primary system cell. The detection statistic on the secondary user is only influenced by the single primary system cell.

Under the assumption of a Gaussian channel and a Rayleigh channel, in the $\mathcal{H}_i$ and $\mathcal{H}_u$ states, the statistic in the above formula (2) may be replaced with a detection signal-to-noise ratio, that is:

$$T_i = \frac{1}{n_s N_{sc}}\sum_{k=1}^{n_s}\sum_{l=1}^{N_{sc}}|s_i[l,k]|^2 = \sum_{k=1}^{n_s}\sum_{l=1}^{N_{sc}}\frac{(\lambda_{(k,l,i)}+1)}{2n_s N_{sc}}\chi^2(2) = \sum_{m=1}^{P}c_m\chi^2(2) \quad (A1)$$

Wherein $\chi^2(2)$ indicates a chi-square variable whose degree of free is 2, $p=n_s N_{sc}$ indicates the number of samples used in detection, and $$c_m = \frac{\lambda_{(k,l,i)}+1}{2p}$$

(where $\lambda_{(k,l,s)}$ is the detection signal-to-noise ratio of $su_i$ to a k-th symbol of an l-th sub-carrier). It can be known from the Formula (A1) that, $C_m$ is related to transmitter (which is a transmitter of a primary user in an uplink direction, and is a transmitter of a primary base station in a downlink direction) power of the primary system, a distance between the transmitter and the secondary user $su_i$ and other factors, therefore, the detection statistic for each secondary user is different from each other.

It is assumed that $d_i$ indicates a distance between the secondary user $su_i$ and the primary base station (PBS), $b_j$ indicates a distance between the primary user $pu_j$ (j=1 ... $n_{pu}$) and the primary base station, and $c_{j,i}$ indicates a distance between $pu_j$ and $su_i$. Based on the above distance information and an energy detection theory, the error detection probability $p_{1f}^{(i)}$ that the $\mathcal{H}_d$ state is detected as the $\mathcal{H}_u$ or $\mathcal{H}_i$ state by the $su_i$ may be estimated with the following formula:

$$p_{1f}^{(i)} = Pr(T_i \leq T_{th}^h | \mathcal{H}_d, d_i) = \Phi\left(\frac{T_{th}^h - 2cp}{c\sqrt{2p}}\right) \quad (A2)$$

Wherein c indicates a power coefficient of each sample in Formula (A1), which represents the power of each sample. Since in a case of the downlink transmission, the power of each sample is the same, so $$c = c_1 = \ldots = c_m = \ldots = c_p = \frac{\lambda_{(k,l,i)} + 1}{2p} = \left(\frac{P_d}{\mathrm{Var}_n PL_{di}} + 1\right) \Big/ 2p,$$

wherein $c_l$, $c_m$ and $c_p$ respectively indicate power coefficients of the samples, and $PL_{d_i}$ indicates path loss between $su_i$ and the primary base station. p indicates the number of samples used in the detection. Pr(x) indicates probability of an event x. $\Phi(x)$ indicates a cumulative distribution function (CDF) in normal distribution.

$$Q_{1f} = f_c(p_{1f}^{(1)}, \ldots p_{1f}^{(k)}, \ldots p_{1f}^{(n_{su})}) \tag{A3}$$

Wherein $Q_{1f}$ indicates a decision strategy, which indicates performance measure of the whole algorithm, and is detection error probability that the downlink transmission is judged as the uplink transmission. $f_c(\ )$ indicates a cooperative and fused performance function, and an independent variable of the performance function (i.e., each parameter in ( ) ) is the detection error probability of each secondary user. According to the above Formulas (A2) and (A3), $Q_{1f}$ values under different $T_{th}^h$ values may be calculated, i.e., sub-frame detection performance in the $\mathcal{H}_d$ state is obtained: the detection error probability that the $\mathcal{H}_d$ state is detected as the $\mathcal{H}_u$ or $\mathcal{H}_i$ state by the secondary base station (SBS) when the link is in the $\mathcal{H}_d$ state. According to correspondence between $T_{th}^h$ and $Q_{1f}$, a value range of $T_{th}^h$ satisfying $Q_{1f} \leq Q_{1f}^d$ may be obtained (wherein $Q_{1f}^d$ indicates a maximum value of $Q_{1f}$ in the $\mathcal{H}_d$ state), that is:

$$T_{th}^h = \frac{\Phi^{-1}(p_{1f}^{(i)}) P_d \sqrt{2p} + 2pP_d}{\mathrm{Var}_n PL_{d_i}} \tag{A4}$$

Wherein $\Phi^{-1}(x)$ indicates an inverse function of the cumulative distribution function in normal distribution.

As can be known from the above Formula (A4), $p_{1f}^{(i)}$ needs to be small enough, i.e., $T_{th}^h$ needs to be less than a specific value, to satisfy the detection performance in the $\mathcal{H}_d$ state. In a case that the maximum value of $P_{1f}^{(i)}$ can be calculated, the specific value may be directly acquired.

If it is difficult for the decision strategy $Q_{1f} = f_c(\ )$ to have a closed-form solution, i.e., it is difficult to acquire a correspondence between $T_{th}^h$ and $Q_{1f}$, then $T_{th}^h$ may be estimated with the following formula:

$$T_{th}^h \leq \max_i \frac{\Phi^{-1}(p_{1f}^{(i)}) P_d \sqrt{2p} + 2pP_d}{\mathrm{Var}_n PL_{d_i}} \approx \frac{\Phi^{-1}(\overline{p_{1f}}) P_d \sqrt{2p} + 2pP_d}{\mathrm{Var}_n PL_{mind_i}} \tag{A5}$$

Wherein $\overline{p_{1f}}$ indicates average detection error probability of a single secondary user, and $$\overline{p_{1f}} = (Q_{1f}^d)^{\frac{1}{n_{su}}}.$$

$PL_{min\ d_i}$ indicates path loss between a secondary user closet to the primary base station and the primary base station in the system. Formula (A5) considers a case that $T_{th}^h$ has a maximum value when the secondary base station finally judges that the current sub-frame or the current link is in the $\mathcal{H}_d$ state as long as one secondary user detects that it is in the $\mathcal{H}_d$ state (which is also referred to as an OR criterion). It can be seen that the maximum value of $T_{th}^h$ here is determined by the secondary user closet to the primary base station. In Formula (A5), $P_{1f}^{(i)}$ in Formula (A4) may be approximately replaced with an average value $$\overline{p_{1f}} = (Q_{1f}^d)^{\frac{1}{n_{su}}}$$

of local (i.e., a single secondary user) detection error probability under the OR criterion.

Similarly, assuming that the error probability that the $\mathcal{H}_u$ state is detected as the $\mathcal{H}_d$ or $\mathcal{H}_i$ state by $su_i$ is $p_{0f}^{(i)}$, then:

$$p_{0f}^{(i)} = Pr(T_i \geq T_{th}^h, T_i \leq T_{th}^l \mid \mathcal{H}_u, b_1, \ldots, b_{n_{uc}}, c_{1,i}, \ldots, c_{n_{uc},i}) \tag{A6}$$

$$= 1 - \Phi\left(\frac{T_{th}^h - \sum_j 2c_j}{\sqrt{\sum_j 2c_j^2}}\right) + \Phi\left(\frac{T_{th}^l - \sum_j 2c_j}{\sqrt{\sum_j 2c_j^2}}\right)$$

Wherein $b_1, \ldots b_{n_{ue}}$ respectively indicate the distance between each primary user and the primary base station, and $c_{1,i}, \ldots c_{n_{ue},i}$ respectively indicate the distance between each primary user and each secondary user. Assuming that each primary user in the primary system is allocated with sub-carriers having the same number $$\frac{N_{sc}}{n_{pu}},$$

then:

$$c_{\left(\frac{N_{sc} n_s}{n_{pu}} - 1\right) j + 1, \ldots, \frac{N_{sc} n_s}{n_{pu}} j} = \frac{\lambda_{(k,l,i)} + 1}{2p} = \frac{\frac{P_0 PL_{b_j}}{PL_{c_{j,i}}} + 1}{2p} \tag{A7}$$

Wherein $PL_{b_j}$ and $PL_{c_{j,i}}$ respectively indicate path loss between $pu_j$ and the primary base station and path loss between $pu_j$ and $su_i$. If an AND criterion is adopted, i.e., the secondary base station judges that it is in the $\mathcal{H}_d$ state only if all secondary users detect that it is in the $\mathcal{H}_d$ state, then the $T_{th}^h$ may have a minimum value, that is.

$$T_{th}^h \geq \max_{i,j}\left(\Phi^{-1}\left(1 + \Phi\left(\frac{T_{th}^l - \sum_j 2c_j}{\sum_j 2c_j^2}\right) - p_{0f}^{(i)}\right)\sqrt{\sum_j 2c_j^2} + \sum_j 2c_j\right) \approx \tag{A8}$$

$$\max_j\left(\Phi^{-1}\left(1 + \Phi\left(\frac{T_{th}^l - \sum_j 2c_j}{\sum_j 2c_j^2}\right) - \overline{p_{0f}}\right)\sqrt{\sum_j 2c_j^2} + \sum_j 2c_j\right)$$

Wherein $$\overline{p_{0f}} = (Q_{0f}^d)^{\frac{1}{n_{su}}},$$

which indicates an average value of the detection error probability by the secondary user under the AND criterion, $Q_{0f}^d$ indicates J a maximum value of $Q_{0f}$ in the $\mathcal{H}_d$ state; and $Q_{0f}$ indicates the actual detection performance measure of the algorithm, representing the detection error probability that the uplink transmission is detected as the downlink transmission. The maximum value $Q_{0f}^d$ may be acquired according to relative positions in a network (here, the primary system and the secondary system are regarded as a network, and the relative positions in the network indicates relative positions between all notes in the primary system and the secondary system).

According to Formulas (A5) and (A8), a feasible search interval of $T_{th}^h$ (i.e., a possible range including the maximum value and the minimum value of the threshold value) may be obtained. Thus obtained search interval is relatively large. In order to enhance the search speed, the searching may be performed near an approximate value of $T_{th}^h$ (such as an approximate value calculated with the above Formula (5)) (specifically, the value of $T_{th}^h$ may be changed, and the value of $Q_{1f}$ and the value of $Q_{0f}$ are estimated under different values of $T_{th}^h$, thereby an optimum value of $T_{th}^h$ may be searched), thereby acquiring the value of $T_{th}^h$. Optionally, any value within the feasible search interval may be used as the threshold value $T_{th}^h$.

As another specific example, it is assumed that the secondary system is located in a single primary system cell and that the secondary system is unable to know about distances between transceivers in the primary system and the secondary system, that is, the secondary system is unable to locate the distances between the transceivers in the primary system and the secondary system.

In such a case in which it is unable to locate, the secondary base station is difficult to acquire relative position information about the primary system and the secondary system, therefore, it is difficult to acquire accurate values of $p_{1f}^{(i)}$ and $p_{0f}^{(i)}$. In this case, the first threshold value $T_{th}^h$ may be set with a semi-simulation method: that is, a simulation method is adopted to generate enough relative positions between the transceivers in the primary system and the secondary system (any suitable method may be utilized to simulate the relative positions between respective transceivers in the primary system and the secondary system, for example, the simulation may be performed according to a common model of node distribution (such as uniform distribution or Poisson distribution) in the network, which is not defined and described here in detail), and values of $Q_{1f}$ and $Q_{0f}$ are calculated under different $T_{th}^h$, and thereby obtaining a $T_{th}^h$ satisfying requirements of $Q_{1f}$ and $Qu_{0f}$, that is:

$$Q_{1f} \approx \sum_{sim}^{N_{sim}} \frac{q_{1f}^{(sim)}}{N_{sim}} \quad (A9)$$

$$Q_{0f} \approx \sum_{sim}^{N_{sim}} \frac{q_{0f}^{(sim)}}{N_{sim}} \quad (A10)$$

Wherein $q_{1f}^{(sim)}$ and $q_{0f}^{(sim)}$ respectively indicate sub-frame performance measure values $Q_{1f}$ and $Q_{0f}^{(sim)}$ that are calculated by utilizing the relative positions obtained in the simulation, and $N_{sim}$ indicates the number that the simulation is performed. With the value of $Q_{1f}$ and the value of $Q_{0f}$ obtained with the above Formulas (A9) and (A10) (i.e., the values of the right-hand side of the formulas (A9) and (A10)), a suitable value of $T_{th}^h$ may be obtained according to the detection performance requirements.

In such an application in which it is unable to locate, the search interval described above is not applicable. That is, in a case that it is unable to locate, the search interval of the threshold value can not be estimated with Formulas (A5) to (A8). If Formula (5) is adopted, then there is no need to adopt the technology described in Formulas (A5) to (A8). As described above, a value between the downlink transmission power and the maximum uplink transmission power of the primary system may be set as the first threshold value, for example, an approximate value calculated with the formula (5) may be adopted.

Two examples in which the secondary system is located in a single primary system cell have been described above. In an environment of multiple primary system cells, the detection statistic of the secondary user is related to the multiple primary system cells. When the multiple primary system cells coexist, transmission power control and frequency allocation are key factors that affect the statistic, and which are mainly decided by a frequency reuse (FR) strategy. For example, when the primary system is a TD-LTE system, two common FR strategies include fractional frequency reuse (FFR) and soft frequency reuse (soft FR).

Figure 13:
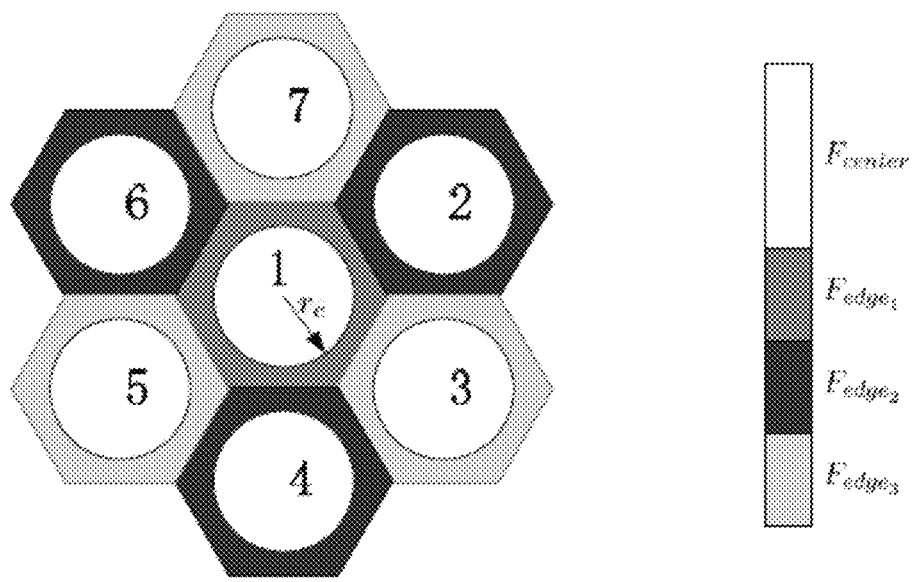
FIGS. 13 and 14 are schematic diagrams respectively illustrating application scenarios of multiple primary system cells adopting different frequency reuse strategies.

FIG. 13 is a schematic diagram illustrating the strict FFR strategy. In FIG. 13, each hexagonal block indicates one primary system cell. In each hexagonal block, the circular region indicates the centre of the primary system cell, and the remaining part other than the circular region indicates the edge of the primary system cell. Under this strategy, in each primary system cell, users located at the centre of the cells are allocated with a same frequency band $F_{center}$. Users located at the edges of respective primary system cells use different frequency bands, and these frequency bands are not overlapped with $F_{center}$. As shown in the figure, $F_{edge1}$ indicates a frequency band used by a user located at the edge of a primary system cell 1; $F_{edge2}$ indicates a frequency band used by a user located at the edge of a primary system cell 2, 4 or 6; and $F_{edge3}$ indicates a frequency band used by a user located at the edge of a primary system cell 3, 5 or 7.

$$F_{center} = \left[ F_{band} \left( \frac{r_c}{R_{ps}} \right)^2 \right],$$

wherein $F_{band}$ indicates bandwidth occupied by the primary system, $R_{ps}$ indicates the radius of a cell, and $r_c$ indicates the radius of the centre region of the cell (for example, $r_c = 0.65 R_{ps}$). In addition, $F_{edge1} = F_{edge2} = F_{edge3} = (F_{band} - F_{center})/3$. Under this strategy, each primary to user in the cell uses the same transmission power.

Figure 14:
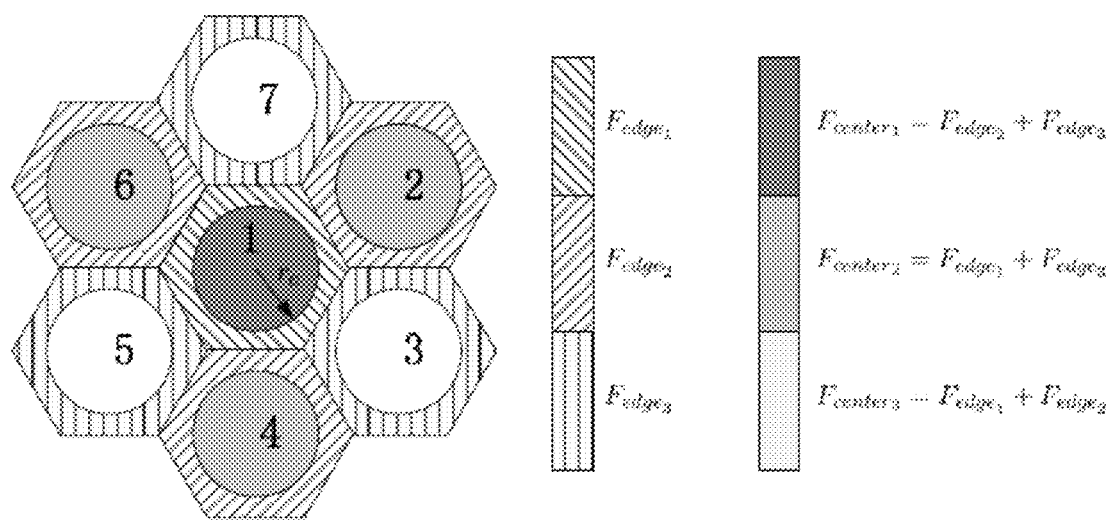

FIG. 14 is a schematic diagram illustrating the soft FFR. In FIG. 14, each hexagonal block indicates one primary system cell. In each hexagonal block, the circular region indicates the centre of the primary system cell, and the remaining part other than the circular region indicates the edge of the primary system cell. Under this strategy, users at the edges of neighboring cells use different frequency bands, the frequency band used by a user at the edge of a cell is not overlapped with the frequency band used by a user at the centre of the cell, and the frequency bands used by users located at the centre of respective cells are overlapped. As shown in the figure, $F_{edge1}$ indicates a frequency band used by a user located at the edge of a primary system cell 1; $F_{edge2}$: indicates a frequency band used by a user located at the edge of a primary system cell 2, 4 or 6; and $F_{edge3}$ indicates a frequency band used by a user located at the edge of a primary system cell 3, 5 or 7. $F_{center1}$ indicates a frequency band used by a user located at the centre of the primary system cell 1; $F_{center2}$ indicates a frequency band used by a user located at the centre of the primary system cell 2, 4 or 6; and $F_{center3}$ indicates a frequency band used by a user located at the centre of the primary system cell 3, 5 or 7. In this case, the magnitude of each $F_{center}$ and the magnitude of each $r_c$ are the same as those under the FFR strategy, which are not repeated here. However, $F_{edge1}$, $F_{edge2}$, and $F_{edge3}$ are set as follows: $F_{edge1}=F_{edge2}=F_{edge3}=\min([F_{band}/3], F_{band}-F_{center})$, and the transmission power of a user located at the edge of a cell is higher than the transmission power of a user located at the centre of the cell.

Figure 15:
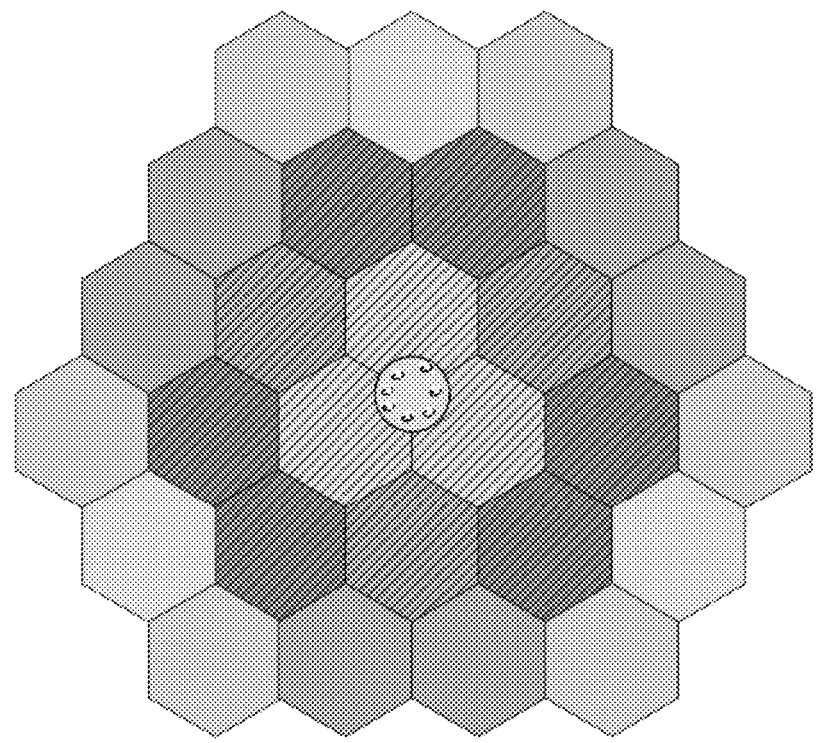
FIG. 15 is a schematic diagram illustrating an example of a scenario where a secondary system is located in multiple primary system cells.

FIG. 15 shows an example of a scenario that a secondary system is located in multiple primary system cells. As shown in FIG. 15, a circle including a secondary system indicates the secondary system and other hexagonal blocks indicate primary system cells. In FIG. 15, 27 primary system cells are shown, wherein the distance between each of the 27 primary system cells and the secondary system is within coverage of three primary system cells, and the hexagonal blocks with oblique lines indicate 12 primary system cells closest to the secondary system. It can be understood that, according to the distance between each primary system cell and the secondary system, the 12 cells located at the centre are cells having the biggest influence on the secondary system, which are not described here in detail.

As a specific example, assuming that it is in a case that the secondary system is located in multiple primary system cells, the secondary system can know about distances between all transceivers in the primary system and the secondary system (i.e., all nodes in the primary system and the secondary system) (a secondary base station may adopt any suitable method to locate distances between the secondary base station and all nodes in the primary system and the secondary system, which is not defined and described here in detail).

In a case that it is able to locate, the secondary system may obtain the relative positions between all transceivers (i.e., all nodes in the primary system and the secondary system). The search interval and the value of $T_{th}^h$ may be obtained according to the FR strategy (for example, the FFR strategy or the soft FFR strategy may be adopted when the primary system is the TD-LTE system) used by the primary system and the method described above with reference to Formulas (A5) to (A8), which is not repeated here.

As another specific example, assuming that it is in a case that the secondary system is located in multiple primary system cells, the secondary system is unable to know about distances between all transceivers in the primary system and the secondary system (that is, a case that it is unable to locate). In this case, the value of $T_{th}^h$ may be obtained according to the FR strategy used by the primary system and the method described above with reference to Formulas (A9) and (A10), which is not repeated here.

Compared with the case of the single primary system cell, it is difficult to obtain the search interval of the threshold value in the case of multiple primary system cells. However, there is a need for the approximate value of $T_{th}^h$ to be calculated in combination with the FR strategy used by the primary system. As illustrated in Formula (5), the approximate value of $T_{th}^h$ is only related to the maximum value of the uplink transmission power. Therefore, under different FR strategies, the power control and frequency allocation for the uplink transmission are important factors that affect the value of $T_{th}^h$ in the case of multiple primary system cells.

Figure 16:
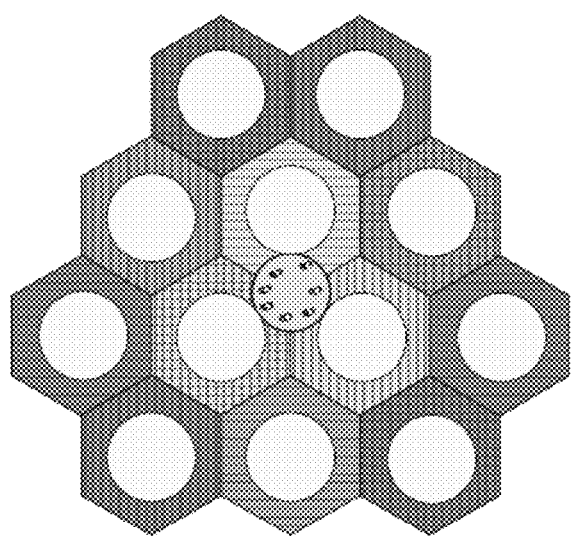
FIG. 16 is a schematic diagram illustrating another example of a scenario where a secondary system is located in multiple primary system cells.

FIG. 16 shows a case in which a secondary system coexists with 12 primary system cells. Assuming that each primary system cell adopts the FFR strategy, then it can be considered that the power (the statistic) received by the secondary system increases by a specific coefficient $F_{12}$ in this case. According to a distance between each primary system cell and the secondary system and the path loss, the coefficient $F_{12}$ may be calculated with the following formula:

$$F_{12} = \frac{\left(3*(\sqrt{3})^\alpha + 3*\left(\frac{\sqrt{3}}{2}\right)^\alpha + 6*\left(\sqrt{\frac{3}{7}}\right)^\alpha\right)}{(\sqrt{3})^\alpha} \quad (A11)$$

Wherein o indicates a large-scale path attenuation factor. As a specific example, when o=3.76, $F_{12}$=3.38.

In addition, under the FFR strategy, the number of the primary users supported by each primary system is different from that in the case of the single primary system cell, and the bandwidth supported by each primary system cell is $$\left[\left(\frac{r_c}{R_{ps}}\right)^2 + \frac{1-(r_c/R_{ps})^2}{3}\right]F_{band}.$$

Therefore, in the case of multiple primary system cells, the approximate value of $T_{th}^h$ may be calculated with the following formula:

$$T_{th}^h = \left(\text{Var}_n + F_{12}\left[\left(\frac{r_c}{R_{ps}}\right)^2 + \frac{1-(r_c/R_{ps})^2}{3}\right]PL_{R_{ps}}P_{u_{max}}\right) \left(1 + \frac{Q^{-1}(\bar{p})}{\sqrt{n_s N_{sc}/2}}\right) \quad (A12)$$

Wherein $PL_{R_{ps}}$ indicates path loss between the centre of a primary system cell (such as a primary system cell closet to the secondary system) and the centre of the secondary system cell, $P_{u_{max}}$ indicates the uplink maximum total transmission power of the primary system. $\bar{p}$ indicates the probability that the $\mathcal{H}_u$ state is detected as the $\mathcal{H}_d$ state by mistake. It should be noted that, the probability $\bar{p}$ is not an actual probability but a reference value.

Similarly, under the scenario shown in FIG. 16, if the soft FR is adopted, then each primary system cell may use all frequency resources. Therefore, only the power control problem needs to be considered. In this case, the approximate value of $T_{th}^h$ may be calculated with the following formula:

$$T_{th}^h = \left(\text{Var}_n + \frac{2+\epsilon}{3\epsilon}F_{12}PL_{R_{ps}}P_{u_{max}}\right)\left(1 + \frac{Q^{-1}(\bar{p})}{\sqrt{n_s N_{sc}/2}}\right) \quad (A13)$$

Wherein $\in$ indicates transmission power ratio of a primary user located at the edge of the primary system cell to a primary user located at the centre of the primary system cell.

Some embodiments for calculating the first threshold value and the second threshold value are described above. It should be understood that, these examples are exemplary. The disclosure is not limited to these specific examples.

Figures 4, 5:
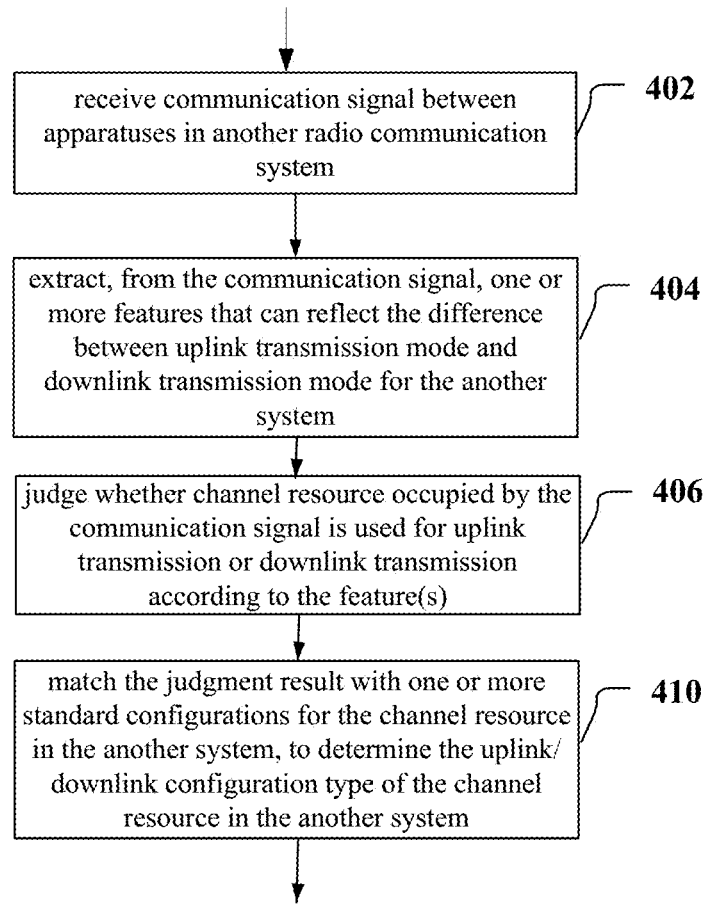
FIG. 4 is a schematic flow chart of a method used in a cognitive radio system according to another embodiment.
FIG. 5 is a chart illustrating frame configurations used in the TD-LTE (Time Division Long Term Evolution) standard.

FIG. 4 shows another specific embodiment of the method used in a cognitive radio system according to the disclosure. In this specific embodiment, after judging whether each channel resource occupied by the communication signal of the primary system is used for the uplink transmission or the downlink transmission, the apparatus in the secondary system may also use priori knowledge about standard configurations for the channel resource in the primary system to further optimize the judgment result.

The standard configuration for the channel resource in the primary system refers to an uplink/downlink configuration type of the channel resource defined in a communication standard of the primary system. The priori knowledge about the standard configurations may be pre-stored in the apparatus of the secondary system (for example, stored in a storage device of the apparatus (which is nor shown in the drawings)), which is not described here in detail.

As shown in FIG. 4, the method is similar to the method shown in FIG. 1, and may include steps 402, 404 and 406. Steps 402, 404 and 406 are respectively similar to steps 102, 104 and 106 shown in FIG. 1, which are not repeated here. In addition, after step 406, the method further includes a step 410. Specifically, at step 410, the judgment result in step 406 is matched with one or more standard configurations for the channel resource in the primary system, to determine the uplink/downlink configuration type of the channel resource in the primary system.

As an example, FIG. 5 shows 7 formats of uplink/downlink frame configuration defined in the TD-LTE standard. Still taking the application scenario shown in FIG. 3 as an example, assuming that the primary system adopts the TD-LTE standard, then one of the 7 frame configurations shown in FIG. 5 should be adopted. As shown in FIG. 5, the TD-LTE standard adopts 7 frame configurations (which are indicated by numbers 0 to 6). Each frame includes 10 sub-frames (which are indicated by numbers 0 to 9). D indicates a downlink sub-frame, U indicates an uplink sub-frame, and S indicates a special sub-frame. After judging the uplink/downlink configuration for each sub-frame at step 406, the apparatus in the secondary system may match the judgment result with these standard configurations, to further determine the format of the uplink/downlink frame configuration for the primary system.

Figure 6:
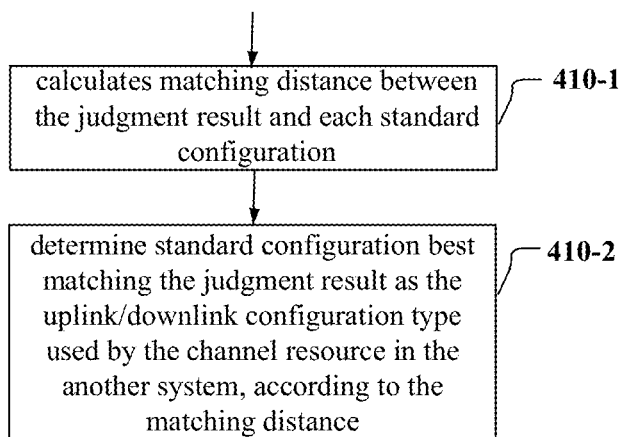
FIG. 6 is a schematic flow chart illustrating an example of a method for calculating a matching distance.

FIG. 6 shows an example for determining the uplink/downlink configuration type of the channel resource according to the standard configurations for the channel resource. As shown in FIG. 6, at step 410-1, the apparatus in the secondary system calculates a matching distance between the judgment result obtained at step 406 and each standard configuration; and then, at step 410-2, the apparatus in the secondary system determines a standard configuration best matching the judgment result according to the calculated matching distance. For example, a standard configuration having the smallest matching distance from the judgment result may be determined as the channel resource configuration type of the primary system.

It should be understood that, any suitable method may be adopted to calculate the matching distance between the judgment result and each standard configuration. Still taking the application scenario shown in FIG. 3 as an example, assuming that the primary system adopts the TD-LTE standard, then one of the 7 standard frame formats shown in FIG. 5 is adopted. The secondary system may judge whether each sub-frame in a frame is an uplink sub-frame or a downlink sub-frame according to the received communication signal, and use for example two different numbers to indicate the judgment result on each sub-frame. For example, "1" may be used to indicate a downlink sub-frame, and "−1" (or 0) may be used to indicate an uplink sub-frame; and vice versa. In this way, judgment results of the apparatus in the secondary system on multiple sub-frames in one frame may form a multi-dimensional vector. Each standard frame format shown in FIG. 5 may also be indicated by a multi-dimensional vector in the same manner. For example, D may be indicated as 1, and U may be indicated as −1. In addition, the specific sub-frame "S" may also be indicated as a downlink sub-frame, that is because the first few symbols of the specific sub-frame are downlink sub-frames (in this case, the number of the symbols $n_s$ used when the feature for judging whether each sub-frame is the uplink sub-frame or the downlink sub-frame is extracted is preferably less than 3). Therefore, the matching distance between the judgment result and each standard configuration may be calculated with a method for calculating a distance between two vectors. It should be understood by those skilled in the art that, any suitable method (such as an example describes hereinafter with reference to Formula (21) or (22) or (26)) may be adopted to calculate the distance between two vectors, which is not described here in detail.

With the method described above with reference to FIG. 4, the apparatus in the secondary system may utilize the priori knowledge about the standard configurations for the channel resource in the primary system, to further optimize the judgment result on the uplink/downlink configuration for the channel resource in the primary system, thereby making the result more accurate.

In a specific embodiment, the apparatus in the secondary system may judge whether the channel resource is used for the uplink transmission or the downlink transmission by utilizing features extracted from multiple communication signals. In other words, when the uplink/downlink configuration for the channel resource in the primary system is detected with the method described with reference to FIG. 1, 2 or 4, the apparatus in the secondary system may receive multiple communication signals (for example, a multi-frame signal is received when the primary system is a communication system based on time division transmission), and utilize the multiple communication signals to repeatedly perform the processing in steps 104 to 106 or steps 204 to 206 (or steps 204 to 208) or steps 404 to 406 (or steps 404 to 410). In this way, influence of a random error event on the matching result is reduced in detecting each sub-frame, thereby making the obtained result on the uplink/downlink configuration for the channel resource more accurate.

In the embodiments and examples described above, a single apparatus in the secondary system is adopted to detect the uplink/downlink configuration for the channel resource in the primary system. In the following, some embodiments that utilize multiple apparatuses in the secondary system to judge the uplink/downlink configuration for the channel resource and fuse judgment results from the multiple apparatuses are described. By utilizing multiple secondary users to cooperate, influence of space distribution of a single secondary user on the accuracy of the detection result of the secondary user may be reduced, thereby making the obtained result on the uplink/downlink configuration for the channel resource more accurate.

Figure 9A:
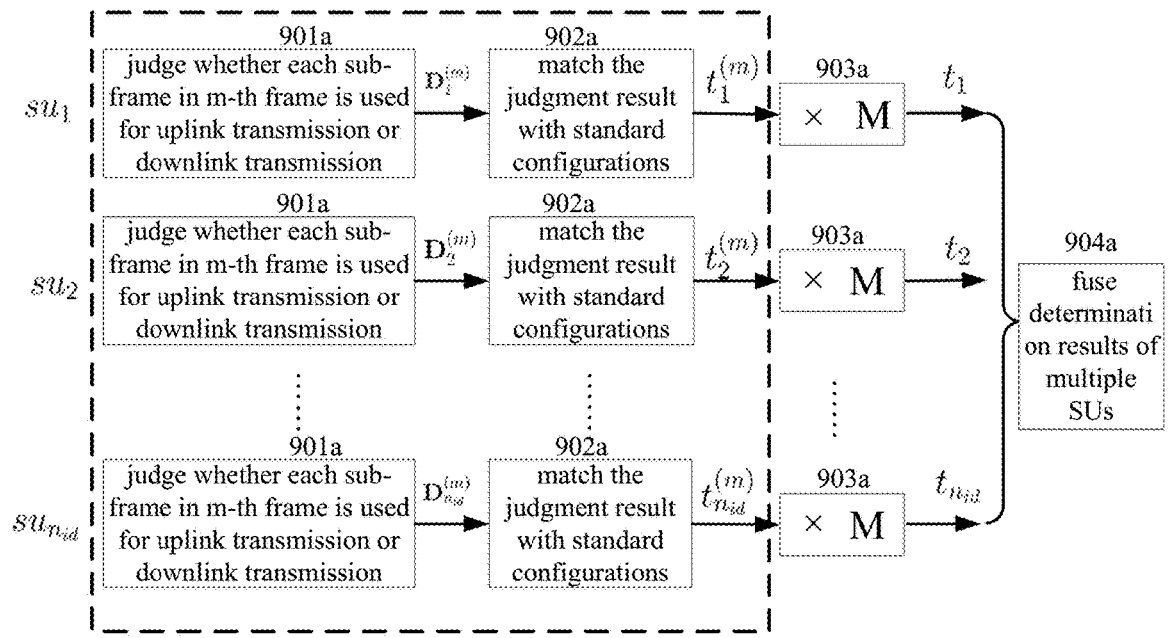
FIGS. 9(A), 9(B) and 9(C) respectively shows models for utilizing multiple apparatuses in a cognitive radio system to detect uplink/downlink configuration for a channel resource in another radio system.
Figure 9B:
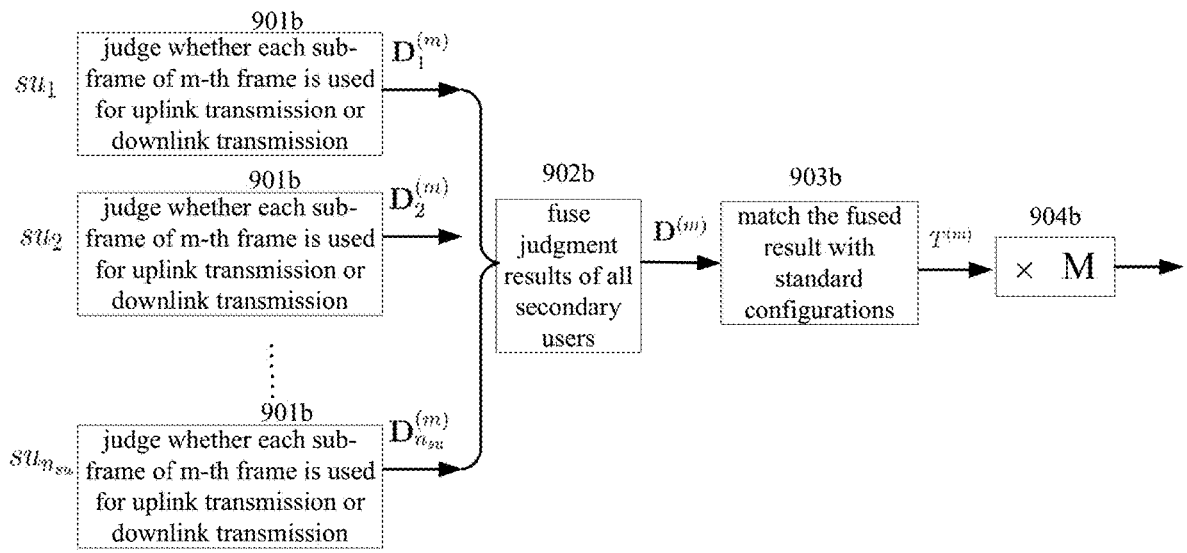
Figure 9C:
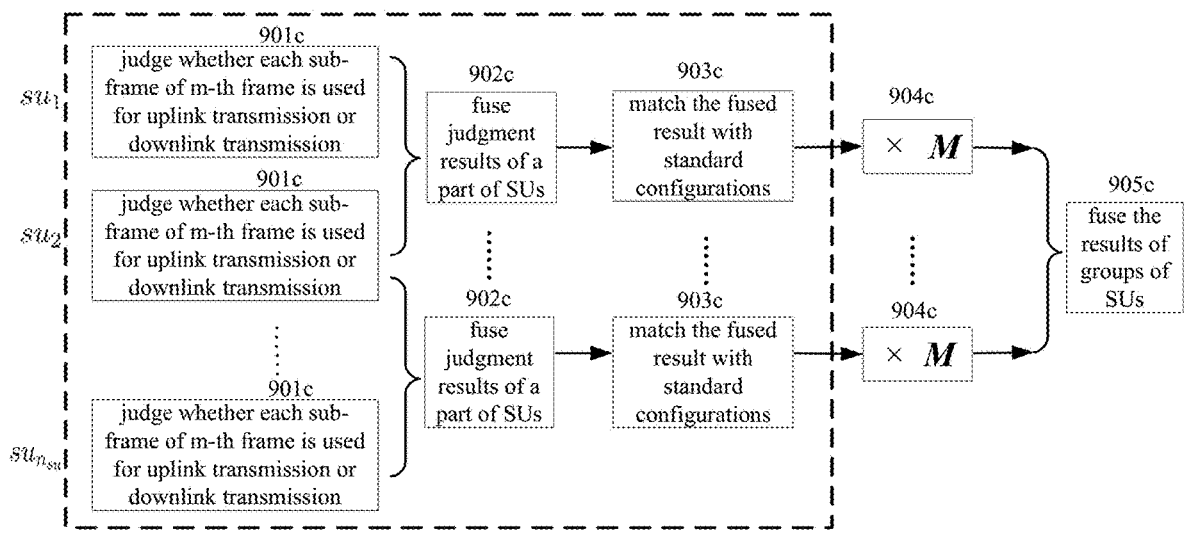

FIGS. 9(A), 9(B) and 9(C) respectively shows schematic models that utilize multiple apparatuses in the secondary system to judge the uplink/downlink configuration for the channel resource and fuse judgment results from the multiple apparatuses, in which the application scenario shown in FIG. 3 is taken as an example, and it is assumed that the primary system is a communication system based on a time division transmission mode. In addition, it is assumed that $n_{id}$ indicates the number of the secondary users in the secondary system that participate in the detection, and $n_{su}$ indicates the number of all secondary users in the secondary system. The $n_{id}$ secondary users may be divided into $n_d$ groups, and the number of the secondary users in each group is $n_{co}=n_{id}/n_d$. The detection may be performed by one secondary user, and may also be performed by multiple secondary users in cooperation, therefore, $1 \leq n_d \leq n_{id} \leq n_{su}$.

In the model shown in FIG. 9(A), each secondary user may use a method described in the above or following embodiments or examples to: judge whether the channel resource occupied by the communication signal is used for the uplink transmission or the downlink transmission, according to one or more features capable of reflecting the difference between a uplink transmission mode and a downlink transmission mode for the primary system that are extracted from the communication signal (block 901a in the figure, $D_i^{(m)}$ a vector, which includes the uplink/downlink judgment results of an i-th secondary user ($su_i(1 \leq i \leq n_{id})$) on all sub-frames of an m-th frame); and match the judgment result with one or more standard configurations for the channel resource in the primary system, to determine the uplink/downlink configuration type of the channel resource in the primary system according to the matching result (block 902a in the figure, $t_i^m$ indicates the determination result of the i-th secondary user ($su_i(1 \leq i \leq n_{id})$) on the m-th frame. Each secondary user may utilize data of M frames to repeat the above processing (the processing shown in blocks 901a and 902a) for M times ("×M" shown in block 903a), to obtain a determination result $t_i$ of the i-th secondary user ($su_i(1 \leq i \leq n_{id})$) on the frame configuration type. The determination results of these secondary users may be sent to one of the secondary users or to the secondary base station to be fused, to further determine the frame configuration type of the primary system (block 904a in the figure).

In the model shown in FIG. 9(B), each secondary user performs the uplink/downlink judgment for all sub-frames in an m-th frame (block 901b in the figure), and then sends all judgment results to one of the secondary users or to the secondary base station to perform the fusion, to obtain a fused result $D^{(m)}$ block 902b in the figure, $D^{(m)}$ is a vector, which includes the uplink/downlink judgment results on all sub-frames in an m-th frame). Then, the fused result is matched with one or more standard configurations for the channel resource in the primary system, to determine the uplink/downlink configuration type of the channel resource in the primary system according to the matching result (block 903b in the figure, for example, the frame configuration type of the m-th frame is obtained, which is indicated as $T^{(m)}$). Data of M frames may be utilized to repeat the processing in blocks 901b, 902b and 903b for M times, and the results obtained after the processing is performed M times are fused to determine the frame configuration type of the primary system (block 904b in the figure).

The model shown in FIG. 9(C) is a combination of the models shown in FIGS. 9(A) and 9(B). Each secondary user performs the uplink/downlink judgment for all sub-frames in an m-th frame (as shown in block 901c of the figure). These secondary users are divided into multiple groups, and the judgment results of each group are sent to one of the secondary users or to the secondary base station to be fused, to further judge the uplink/downlink configuration for each sub-frame in the m-th frame (as shown in block 902c of the figure). Then, the fused result of the judgment results of each group is matched with each standard configuration, to obtain a matching result for each group (block 903c). Data of M frames may be utilized to repeat the processing in blocks 901c, 902c and 903c for M times, and the results of the M times are fused to determine the frame configuration type of the primary system (block 904c in the figure). Finally, the obtained multiple determination results are further fused, to determine the final frame configuration type of the primary system (block 905c in the figure).

In the following, some specific embodiments of a method for utilizing multiple apparatuses in the secondary system to detect the uplink/downlink configuration for the channel resource in the primary system will be described. The method for fusing the judgment results from multiple secondary users that are shown in FIGS. 9(A), 9(B) and 9(C) may refer to the specific embodiments described hereinafter.

Figure 7:
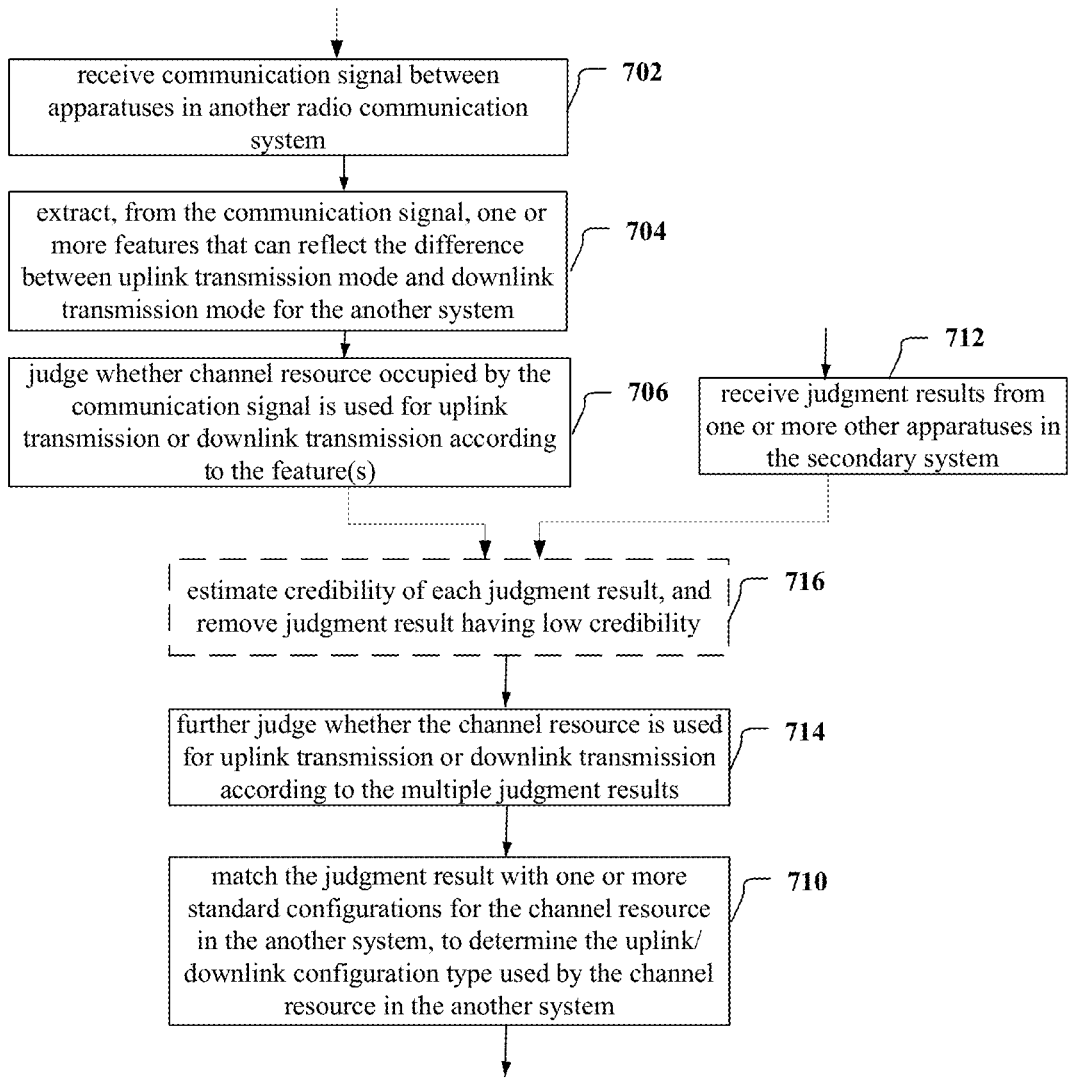
FIG. 7 is a schematic flow chart of a method used in a cognitive radio system according to another specific embodiment of the disclosure.

FIG. 7 shows a specific embodiment of a method for detecting the uplink/downlink configuration for the channel resource in the primary system by utilizing multiple apparatuses in the secondary system.

As shown in FIG. 7, the method may include steps 702, 704, 706, 710, 712 and 714.

Steps 702, 704 and 706 are similar to steps 102, 104 and 106 described above (or steps 202, 204 and 206, or steps 402, 404 and 406). Specifically, the apparatus in the secondary system (which is referred to as a first apparatus) receives a communication between respective apparatuses in the primary system; extracts, from the communication signal, one or more features that can reflect the difference between an uplink transmission mode and a downlink transmission mode for the primary system; and judges whether the channel resource occupied by the communication signal is used for the uplink transmission or the downlink transmission according to the extracted features, which is not described here in detail.

At step 712, the first apparatus receives judgment results about whether the channel resource occupied by the communication signal between apparatuses in the primary system is used for the uplink transmission or the downlink transmission, from one or more other apparatuses (which is referred to as a second apparatus) in the secondary system.

It should be understood that, each second apparatus may use the method of steps 702 to 706 to judge whether the channel resource occupied by the communication signal between respective apparatuses in the primary system is used for the uplink transmission or the downlink transmission, which is not repeated here.

Then, at step 714, the first apparatus judges whether the channel resource occupied by the communication signal is used for the uplink transmission or the downlink transmission, according to the judgment result thereof and the judgment results from one or more second apparatuses.

In the following, still taking the application scenario shown in FIG. 3 as an example, an example of a method for fusing the judgment results from multiple apparatuses in the secondary system will be described.

It is assumed that $n_{id}$ secondary users in the secondary system are utilized to judge (detect) whether the channel resource occupied by the communication signal of the primary system is used for the uplink transmission or the downlink transmission, and that the primary system is a TD-LTE system, and the standard frame configurations shown in FIG. 5 are adopted. Each secondary user in the $n_{id}$ secondary users may adopt the method described above to generate a judgment result on each sub-frame in one frame locally, that is, each secondary user obtains a deterministic judgment result on each sub-frame that is related to the three states $\mathcal{H}_d$, $\mathcal{H}_u$ and $\mathcal{H}_i$. The judgment results of the $n_{id}$ secondary users may be divided into multiple groups, in which each group includes the judgment results of $n_{co}$ secondary users ($n_{id} \geq n_{co}$). The judgment results of each group may firstly be fused, and then the fused results of the multiple groups are fused together.

As a specific example, the judgment results of the multiple secondary users may be sent to one of the secondary users (or sent to the secondary base station in the secondary system), to be fused by the secondary user (or the secondary base station).

As an example, the judgment result of each secondary user on each channel resource (such as each sub-frame) may be duality (the sub-frame is used for the uplink transmission or the downlink transmission), and the duality judgment results of the multiple secondary users on the sub-frame uplink/downlink type may be fused directly.

As another example, the judgment result of each secondary user on each channel resource (such as each sub-frame) may be ternary ($\mathcal{H}_d$, $\mathcal{H}_u$, and $\mathcal{H}_i$). The example may adopt the method described above with reference to FIG. 2 that utilizes two threshold values. In the following, the example is described by taking the application scenario shown in FIG. 3 as an example. It is assumed that $d_i$ indicates a judgment result on a sub-frame that is obtained after an i-th secondary user ($su_i$) compares an estimated energy value of the sub-frame that is estimated by the i-th secondary user with the first threshold value $T_{th}^h$ and the second threshold value $T_{th}^h$ (that is, the method for judging the uplink/downlink configuration for the channel resource by using two threshold values that is described above with reference to FIG. 2 is adopted), that is:

$$d_i = \begin{cases} 2; & \text{if } T_i \geq T_{th}^h \\ 1; & \text{if } T_{th}^l < T_i < T_{th}^h \\ 0; & \text{others} \end{cases} \quad (8)$$

$d_i$ in the above formula may be indicated with 2 bits. Assuming that judgment results of $n_{co}$ secondary users are to be fused, then the judgment results of the $n_{co}$ secondary users on each sub-frame may be accumulated. Assuming that $n_i$ (i=0, 1, 2) indicates the number of judgment results whose $d_i$ is respectively 0, 1 and 2 among the judgment results of the $n_{co}$ secondary users on a sub-frame, and the $n_{co}$ secondary users are the n-th group among the $n_{id}$ secondary users participating in the detection, then the decision result $D_n$ of this group of the secondary uses on the sub-frame may be obtained by fusing (such as accumulating) the judgment results of the $n_{co}$ secondary users:

$$\begin{cases} \mathcal{H}_d \text{ and } D_n = 1; & \text{if argmax}_i\, n_i = 2 \\ \mathcal{H}_u \text{ and } D_n = -1; & \text{if argmax}_i\, n_i = 1 \\ \mathcal{H}_i \text{ and } D_n = -1; & \text{if argmax}_i\, n_i = 0 \end{cases} \quad (9)$$

That is, if the number of the judgment results which judge that a sub-frame is 2 (downlink) is the biggest among the $n_{co}$ judgment results on the sub-frame, then it is decided that the sub-frame is a downlink sub-frame, i.e., $D_n$=1. If the number of the judgment results which judge that a sub-frame is 1 or 0 (uplink) is the biggest among the $n_{co}$ judgment results on the sub-frame, then it is decided that the sub-frame is a uplink sub-frame, i.e., $D_n$=−1.

The above decision may be performed on each sub-frame in one frame, to obtain decision results of each group of the secondary users on the uplink/downlink types of all sub-frames. The judgment results of an n-th group of the secondary users on all sub-frames of an m-th frame may be indicated as a vector $D_n^{(m)}$, i.e., $D_n^{(m)}$ includes the judgment results of the n-th group of the secondary users on all sub-frames of the m-th frame.

In another example, it is assumed that $\tilde{d}_i$ indicates a judgment result on a sub-frame that is obtained after an i-th secondary user ($su_i$) of the $n_{co}$ secondary users compares an estimated energy value of the sub-frame that is estimated by the i-th secondary user with the second threshold value $T_{th}^l$, that is:

$$\tilde{d}_i = \begin{cases} 1 & \text{if } T_i \geq T_{th}^l \\ 0 & \text{otherwise} \end{cases} \quad (10)$$

Assuming that judgment results of the $n_{co}$ secondary users are to be fused, then the judgment results of the $n_{co}$ secondary users on each sub-frame may be accumulated, that is:

$$\begin{cases} \mathcal{H}_d \text{ and } D_n = 1; & \text{If } n_{de} \geq n_{th}^h, \\ \mathcal{H}_u \text{ and } D_n = -1; & \text{If } n_{th}^l < n_{de} < n_{th}^h, \\ \mathcal{H}_i \text{ and } D_n = -1; & \text{If } n_{de} \leq n_{th}^l, \end{cases} \quad (11)$$

In the above formula, $n_{de}$ indicates the number of the secondary users which detect a primary user signal in a sub-frame among the $n_{co}$ secondary users, that is:

$$n_{de} = \sum_{i=1}^{n_{co}} \tilde{d}_i \quad (12)$$

In Formula (11), $n_{th}^h$ indicates a threshold value (a third threshold value) for further judging whether the sub-frame is an uplink sub-frame or a downlink sub-frame. That is, among the $n_{co}$ secondary users, if the number of the secondary users which judge that a primary user signal exists in the sub-frame is more than $n_{th}^h$, then it may decide that the sub-frame is a downlink sub-frame; otherwise, it may decide that the sub-frame is an uplink sub-frame. After it is decided that the sub-frame is the uplink sub-frame, a threshold value $n_{th}^l$ (a fourth threshold value) may be adopted to further determine whether the uplink sub-frame is totally idle or a part of the uplink sub-frame is allocated to a sub-carrier of a primary user. Since the downlink transmission power is relatively high, almost every secondary user may detect a primary user signal by utilizing the second threshold value $T_{th}^l$. Therefore, the $n_{th}^h$ may be set as $n_{co}$, or $n_{co}$−1. Whereas the $n_{th}^l$ may be set with reference to the value of $P_f^i$. Since under the $\mathcal{H}_i$ state, the number of the secondary users which correctly detect the $\mathcal{H}_i$ state is $n_{co}(1-p_f^i)$, $n_{th}^l$ may be set to satisfy $n_{th}^l < n_{co}(1-p_f^i)$ and keep a certain difference from $n_{th}^h$. It should be understood that, any suitable method may be adopted by those skilled in the art to set the threshold values according to practical applications, and the disclosure is not limited to the above examples.

The example of a hard information decision method (i.e., a duality result is adopted to indicate the judgment result of each group of the secondary users on the sub-frame) that fuses the judgment results of each group of the secondary users (such as $n_{co}$ secondary users) is described above. Specifically, the numbers 1 and −1 are used to indicate whether the sub-frame is an uplink sub-frame or a downlink sub-frame. It should be understood that, in practical applications, any duality numbers may be adopted to indicate the above judgment results, for example, 1 and 0 and the like may be adopted, which is not enumerated here.

In the following, an example of a soft information decision method is described. The soft information decision method described herein refers to that: the duality numbers are not used to indicate the decision result obtained after the judgment results of each group of the secondary users (such as $n_{co}$ secondary users) are fused, and a numerical interval is adopted to indicate the decision result. Different positions within the numerical interval corresponding to each sub-frame reflect likely probability that the sub-frame is an uplink sub-frame or a downlink sub-frame. With this soft information decision method, the accuracy of decision may be further improved. For example, in the above example of the hard information decision method, the downlink sub-frame is indicated as "1", and the uplink sub-frame is indicated as "−1". Whereas in the soft information decision method, a difference between a statistic (such as an energy estimation value) on each sub-frame and a threshold value (such as the first threshold value) may be mapped into a numerical interval (such as [−1, 1] or [0, 1]). The smaller the mapped value of the difference within the numerical interval, the bigger the probability that the sub-frame is an uplink sub-frame; otherwise, the bigger the probability that the sub-frame is a downlink sub-frame. As another specific example, a statistic (such as an energy estimation value) of each secondary user on each sub-frame may be compared with a threshold value (such as the first threshold value) to obtain a difference, and the differences obtained by the $n_{co}$ secondary users may be averaged, then the obtained average value may be set as the decision result obtained by fusing the judgment results of the group of the secondary users.

Assuming that $T_i(1 \leq i \leq n_{co})$ is an energy estimation value of an i-th secondary user among the $n_{co}$ secondary users on a sub-frame, then an average value of the energy estimation values $\tilde{T}$ of these secondary users may be indicated as:

$$\tilde{T} = \sum_{i=1}^{n_{co}} T_i / n_{co} \quad (13)$$

The average value is compared with the threshold values $T_{th}^l$ and $T_{th}^h$ respectively. When $\tilde{T} \leq T_{th}^l$, it is decided that the sub-frame is in the $\mathcal{H}_i$ state; otherwise, $\tilde{T} - T_{th}^h$ is mapped into the range of [−1, 1] (other numerical intervals may also be adopted), and the mapped value reflects the probability that the sub-frame is an uplink sub-frame or a downlink sub-frame. Since $\tilde{T} \in [0, +\infty)$, when the mapping is performed, a maximum value A and a minimum value B may be set to define a difference value interval which may be used for mapping. Any suitable mapping mode may be adopted, for example, the following mapping mode is adopted:

$$\begin{cases} \tilde{D}_n = \dfrac{\tilde{T} - T_{th}^h}{T_{th}^h - B} & \text{if } B \leq \tilde{T} < T_{th}^h \\ \tilde{D}_n = \dfrac{\tilde{T} - T_{th}^h}{A - T_{th}^h} & \text{if } T_{th}^h \leq \tilde{T} < A \\ \tilde{D}_n = -1 & \text{if } \tilde{T} < B \\ \tilde{D}_n = 1 & \text{otherwise} \end{cases} \quad (14)$$

In the above formula, $\tilde{D}_n$ indicates a decision result about whether the sub-frame is an uplink sub-frame or a downlink sub-frame. As can be known from the above formula, when A is selected to be big enough, there is a need for B to be selected to be small enough, so that $Pr(\tilde{T}>A)$ and $Pr(\tilde{T}<B)$ are small enough, thereby making the mapping reasonable. On the other hand, A cannot be too big and B cannot be too small, otherwise, accuracy of the mapping is influenced. When $\tilde{T} \geq T_{th}^h$, it may be considered that the corresponding sub-frame is a downlink signal plus a noise signal. Since the downlink power is uniformly allocated to each sub-carrier and is a constant value, $\tilde{T}$ is only influenced by a complex noise signal. Therefore, the maximum A may be set to satisfy the following relationship:

$$A = P_d PL_{R_{ps}} + \alpha \text{Var}_n \quad (15)$$

In the above formula, $\alpha$ is constant. Preferably, $\alpha$ may be set as $\alpha=8$, so that $Pr(\tilde{T}>A)$ is small enough. Since the complex noise sample energy in this case is in exponential distribution, $Pr(\tilde{T}>A)$ will be very small when $\alpha=8$.

On the other hand, when $\tilde{T}<T_{th}^h$, it may be consider that the sub-frame is an uplink signal plus a noise signal. Since the uplink signal power is not fixed and may be large or small, the value of B may be decided by the noise power. Therefore, the value of B may be determined with the following formula:

$$B = \beta \text{Var}_n \quad (16)$$

That is, when $\tilde{T}<B$, it may consider that the sub-frame is an uplink sub-frame. $\beta$ is constant, preferably, $\beta$ may also be set as 8. It can be seen that $T_{th}^l<B$ by comparing $T_{th}^l$ with B. That is, the decision result is necessarily mapped to "−1" in the $\mathcal{H}_i$ state.

In the above example, the above decision may be performed on each sub-frame in one frame, to obtain decision results of each group of the secondary users on the uplink/downlink types of all sub-frames. The decision results of an n-th group of the secondary users on all sub-frames in an m-th frame may be indicated as a vector $\tilde{D}_n^{(m)}$, and $\tilde{D}_n^{(m)}$ includes the decision results of the n-th group of the secondary users on all sub-frames in the m-th frame.

After the above fusing is performed, at step 710, the decision result obtained at step 714 is matched with one or more standard configurations for the channel resource in the primary system, to determine the uplink/downlink configuration type of the channel resource in the primary system. Step 710 is similar to the above described Step 410, which is not repeated herein.

Optionally, before the determining (step 710) is performed, credibility of each judgment results may also be estimated, and a judgment result having low credibility may be removed (the step shown in the dashed line block 718 in FIG. 7).

In the following, by taking the judgment results $D_n^{(m)}$ of the n-th group of the secondary users on all sub-frames in the m-th frame in the above example as an example, an example of a method for estimating the credibility of the judgment result may be described. It is still assumed that the primary system is the TD-LTE system, and 7 frame configurations shown in FIG. 5 are adopted. The 7 frame configurations shown in FIG. 5 may be indicated by a matrix C with 7 rows and 10 columns that is shown in the following formula:

$$C = \begin{bmatrix} 1 & 1 & -1 & -1 & -1 & 1 & 1 & -1 & -1 & -1 \\ 1 & 1 & -1 & -1 & 1 & 1 & 1 & -1 & -1 & 1 \\ 1 & 1 & -1 & 1 & 1 & 1 & 1 & -1 & 1 & 1 \\ 1 & 1 & -1 & -1 & -1 & 1 & 1 & 1 & 1 & 1 \\ 1 & 1 & -1 & -1 & 1 & 1 & 1 & 1 & 1 & 1 \\ 1 & 1 & -1 & 1 & 1 & 1 & 1 & 1 & 1 & 1 \\ 1 & 1 & -1 & -1 & -1 & 1 & 1 & -1 & -1 & 1 \end{bmatrix} \quad (17)$$

In the above formula, each row represents one frame configuration shown in FIG. 5, in which "1" indicates a downlink sub-frame, and "−1" indicates an uplink sub-frame. In addition, as described above, the specific sub-frame "S" shown in FIG. 5 also indicates a downlink sub-frame, that is because the first few symbols of the specific sub-frame are the downlink sub-frames (in this case, the number of the symbols $n_s$ used when the feature for judging whether each sub-frame is the uplink sub-frame or the downlink sub-frame is extracted is preferably less than 3).

It can be known from the formula (17) that, in the matrix C, elements in each column of the 0-th column to the second column, the fifth column and the sixth column are the same as each other. Therefore, for each row, among 5 elements in the 0-th column to the second column, the fifth column and the sixth column of $D_n^{(m)}$, if more than $s_{th}$ elements are same as the corresponding elements in C, then it may judge that the detection results on the sub-frames in the m-th frame are credible. For example, the credibility of $D_n^{(m)}$, may be estimated with the following formula:

$$s = \sum_{j=0,1,2,5,6} D_n^{(m)}(j)C(1, j) \quad (18)$$

Wherein s indicates the credibility of $D_n^{(m)}$. When the number of elements among the 5 elements in $D_n^{(m)}$ which are the same as the corresponding elements in C is relatively large, the value of s is relatively large; otherwise, the value of s is relatively small. When $s_{th}$ elements among the 5 elements are the same as the corresponding elements in C, $s=1*s_{th}+(-1)*(5-s_{th})=2s_{th}-5$. Therefore, when $s \geq 2s_{th}-5$, it may consider that the judgment result is credible, otherwise, the judgment result may be removed. In the example, considering that there are only 5 fixed sub-frame types in the matrix C, then $s_{th}$ may be set as 3. $s_{th}$ may also be referred to as a fifth threshold value. It should be understood that, the value of the fifth threshold value $s_{th}$ may be determined according to practical applications, which should not be limited to the above example.

In the following, by taking the judgment results $\tilde{D}_n^{(m)}$ of the n-th group of the secondary users on all sub-frames in the m-th frame in the above example as an example, an example of a method for estimating the credibility of the judgment result may be described. The credibility $\tilde{s}$ of $\tilde{D}_n^{(m)}$ may be estimated with the following formula:

$$\tilde{s} = \sum_{j=0,1,2,5,6} \tilde{D}_n^{(m)}(j)C(1, j) \quad (19)$$

$\tilde{D}_n^{(m)} \in [-1, 1]$, where a larger value indicates larger probability that the sub-frame is a downlink sub-frame, and a smaller value indicates larger probability that the sub-frame is an uplink sub-frame. A larger value of S indicates that the value for representing the judgment result on the sub-frame in $\tilde{D}_n^{(m)}$ is relatively correct, that is, the judgment result $\tilde{D}_n^{(m)}$ is credible $\tilde{s}$ is is not necessarily an integer. As an example, in a case that $\tilde{s} \geq 0$ is satisfied, it is considered that the judgment result $\tilde{D}_n^{(m)}$ is credible.

Figure 8:
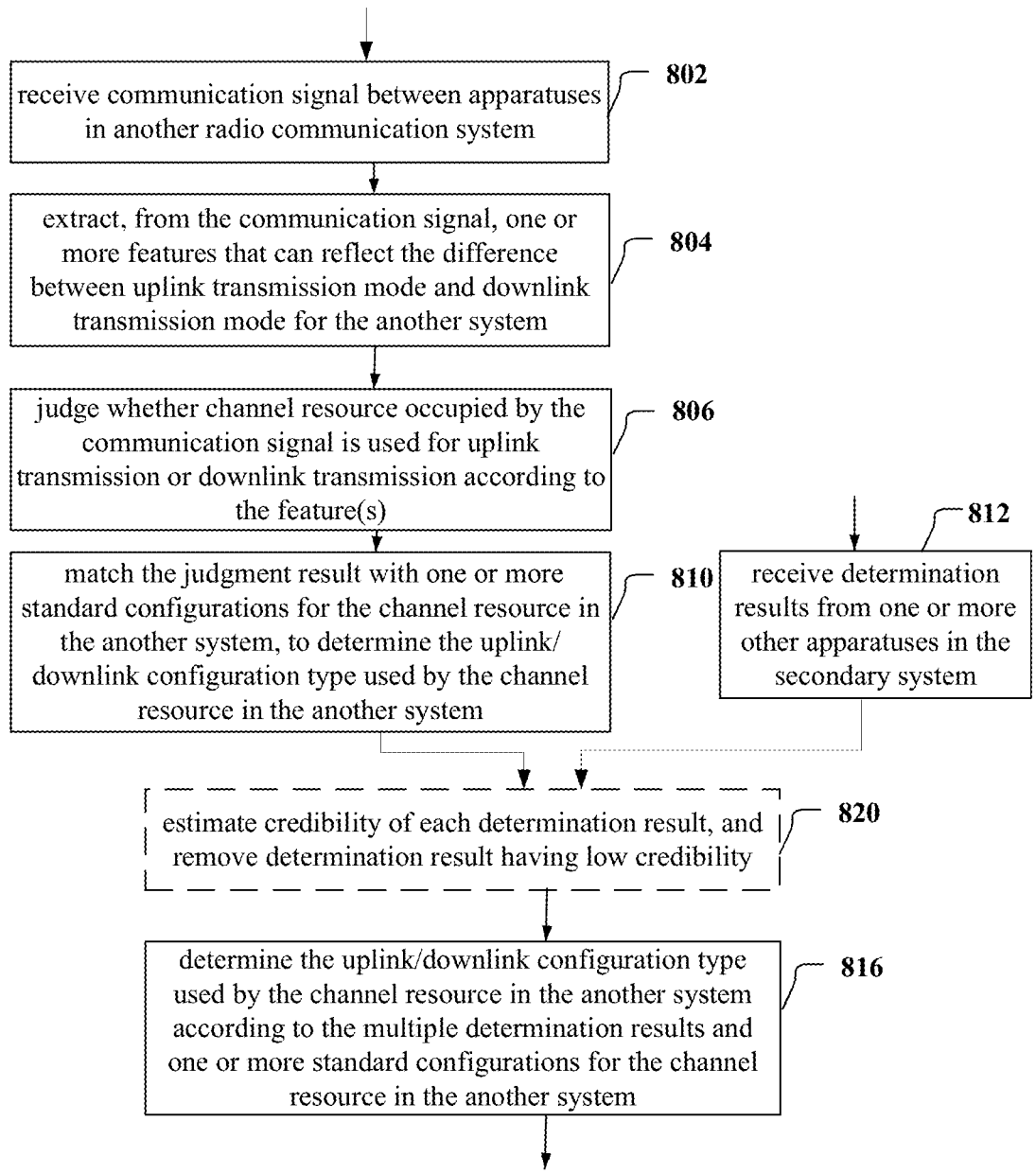
FIG. 8 is a schematic flow chart of a method used in a cognitive radio system according to another specific embodiment of the disclosure.

FIG. 8 shows another specific embodiment of a method for utilizing multiple apparatuses in the secondary system to detect the uplink/downlink configuration for the channel resource in the primary system.

As shown in FIG. 8, the method may include steps 802, 804, 806, 810, 812 and 816.

Steps 802, 804, 806 and 810 are respectively similar to steps 402, 404, 406 and 410 described above. Specifically, the apparatus in the secondary system (which is referred to as a first apparatus) receives a communication between apparatuses in the primary system; extracts, from the communication signal, one or more features that can reflect the difference between an uplink transmission mode and a downlink transmission mode for the primary system; judges whether the channel resource occupied by the communication signal is used for the uplink transmission or the downlink transmission according to the extracted features; and matches the judgment results with one or more standard configurations for the channel resource in the primary system, to determine the uplink/downlink configuration type of the channel resource in the primary system according to the matching result, which are not described here in detail.

At step 812, the first apparatus receives determination results on the uplink/downlink configuration type of the channel resource in the primary system, from one or more other apparatuses (which is referred to as a second apparatus) in the secondary system.

Optionally, after receiving the determination results from the second apparatuses, the first apparatus may also estimate credibility of the determination result thereof and credibility of each of these received determination results, and remove a determination result having low credibility (as shown in the dashed line block 820 in FIG. 8). The credibility may be calculated with the example described above with reference to Formula (18) or (19) or an example described hereinafter with reference to formula (23) or (27), which is not repeated here.

Then, at step 816, the first apparatus fuses the determination result thereof and the determination results from one or more second apparatuses, to determine the uplink/downlink configuration type of the channel resource in the primary system. Specifically, multiple determination results may be fused, a matching distance between the fused result and each standard configuration may be estimated, and the uplink/downlink configuration type of the channel resource in the primary system is determined according to the matching distance.

Still taking the application scenario shown in FIG. 3 as an example, an example of a method for fusing determination results of multiple apparatuses in the secondary system to determine the uplink/downlink configuration type of the channel resource in the primary system is described. It is still assumed that the primary system is the TD-LTE system, and the 7 frame configurations shown in FIG. 5 are adopted. In addition, it is still assumed that $n_{id}$ secondary users in the secondary system are utilized to determine the uplink/downlink configuration type of the channel resource in the primary system. The determination results of the $n_{id}$ secondary users on each sub-frame may be divided into multiple groups, in which each group includes the determination results of $n_{co}$ secondary users ($n_{id} \geq n_{co}$). The determination result of each group may be firstly fused, to obtain a decision result including the determination results of the $n_{co}$ secondary users on all sub-frames in a frame. For example, the method described above with reference to the formula (9) or (14) may be adopted to fuse the determination results of the $n_{co}$ secondary users, to obtain a vector $D_n^{(m)}$ (or $\tilde{D}_n^{(m)}$, $D_n^{(m)}$ (or $\tilde{D}_n^{(m)}$) is compared with each frame configuration shown in FIG. 5, and one frame configuration having the smallest matching distance from $D_n^{(m)}$ (or $\tilde{D}_n^{(m)}$) may be found.

As described above, the 7 configurations shown in FIG. 5 may constitute the matrix C shown in formula (17).

Firstly, taking the vector $D_n^{(m)}$ as an example, a specific example for utilizing determination results of multiple apparatuses in the secondary system to determine the uplink/downlink configuration type of the channel resource in the primary system is described.

In an example, in order to calculate the matching distance between $D_n^{(m)}$ and each frame configuration, a difference between $D_n^{(m)}$ and each row in C (corresponding to one frame configuration) may be firstly calculated with the following formula:

$$S_n^{(m)} = I_{7 \times 1} D_n^{(m)} - C \qquad (20)$$

$S_n^{(m)}$ indicates a difference matrix $S_n^{(m)}$ between $D_n^{(m)}$ and C. $I_{7 \times 1}$ indicates a 7×1 unit matrix. As can be known from the formulas (17) and (18), only three kinds of elements are in $S_n^{(m)}$: "−2", "0" and "2". If an element $S_n^{(m)}$ (j, k)(0≤j≤6, 0≤k≤9) is "2", then it is indicated that the frame configuration is j (a j-th row in the matrix C), and the sub-frame k is misjudged as a downlink sub-frame; if $S_n^{(m)}$(j, k) (0≤j≤6, 0≤k≤9) is "−2", then it is indicated that the frame configuration is j and the sub-frame k is misjudged as an uplink sub-frame; and if $S_n^{(m)}$(j, k)(0≤j≤6, 0≤k≤9) is "0", then it is indicated there is no misjudgment.

Then, the matching distance between $D_n^{(m)}$ and each frame configuration in C may be calculated based on the number of various elements in $S_n^{(m)}$. In the following, two specific examples of calculating the mating distance are illustrated.

In one specific example, the matching distance may be calculated by utilizing a difference between $D_n^{(m)}$ and each frame configurations in C. A vector is constituted by the matching distances between $D_n^{(m)}$ and each frame configurations in C, and is indicated as $DI_n^{(m)}$. For example, $DI_n^{(m)}$ may be calculated by utilizing the number of nonzero elements (i.e., the number of times that an error decision occurs) in $S_n^{(m)}$. The matching distance $DI_n^{(m)}$ (j) (i.e., a j-th element in $DI_n^{(m)}$ $D_n^{(m)}$ between $D_n^{(m)}$ and a j-th configuration type may be defined as:

$$DI_n^{(m)}(j) = \sum_{i=-2,2} N_n^{(i)}(j) \qquad (21)$$

Wherein $N_n^{(m)}(j)$ indicates the number of non-zero elements in a j-th row in $S_n^{(m)}$.

In another specific example, when the matching distance is calculated, an element "i" may be weighted, to show different effects of the nonzero elements "−2" and "2" in calculating the matching distance. For example, the following formula may be adopted:

$$DI_n^{(m)}(j) = \sum_i N_n^{(i)}(j) * w_i \qquad (22)$$

Wherein i=2, −2, 0; $w_j$ indicates a weighting coefficient of an element whose) value is i; $DI_n^{(m)}(j)$ indicates the matching distance between $D_n^{(m)}$ and a j-th configuration type; and $N_n^i$ (j) indicates the number of non-zero elements in a j-th row in $S_n^{(m)}$ $DI_n^{(m)}$ (j) (0≤j≤6) constitute a vector $DI_n^{(m)}$, which includes the matching distances between $D_n^{(m)}$ and respective frame configurations in C. A position of an element having the minimum value in $DI_n^{(m)}$ corresponds to a frame configuration type having a smallest matching distance from $D_n^{(m)}$. Preferably, $w_0=0$, and $w_2$ and $w_{-2}$ may be set as different values. For example, it can make $w_2=w_{-2}$, which indicates that the matching distance is proportional to the number of the sub-frames whose types are different from each other. For another example, $w_2$ may be different from $w_{-2}$, and the values thereof may be set with reference to error probability that an uplink sub-frame is misjudged as a downlink sub-frame or a downlink sub-frame is misjudged as an uplink sub-frame in sub-frame detection, thereby improving the accuracy of matching. For example, if the probability $P_m^d$ that a downlink sub-frame is misjudged as an uplink sub-frame is less than the probability $P_f^u$ that an uplink sub-frame is misjudged as a downlink sub-frame, then it is indicated that, in a row corresponding to a correct frame configuration type in $S_n^{(m)}$, the probability that element "−2" appears will less than the probability that element "2" appears. Therefore, it can make $w_{-2} > w_2$ to increase the matching distance between a frame configuration type that more "−2" appear and $D_n^{(m)}$; otherwise, it can make $w_{-2} < w_2$.

After the matching distance between the determination result and each standard configuration is obtained, a standard configuration having the smallest matching distance from the determination result may be determined as the uplink/downlink configuration type of the channel resource in the primary system.

Optionally, after the matching distance between the determination result and each standard configuration is estimated, it may further judge whether a predetermined relationship is satisfied between the obtained smallest matching distance and a predetermined threshold value (which is referred to as a sixth threshold value), if yes, then it is considered that a standard configuration corresponding to the smallest matching distance is the uplink/downlink configuration type of the channel resource in the primary system. For example, it is assumed that the sixth threshold value is denoted by $W_{th}$, only if the smallest matching distance is less than or equal to the threshold value, it is determined that the standard configuration corresponding to the smallest matching distance is valid; otherwise, it is determined that the matching result is invalid. Taking the matching distance vector $DI_n^{(m)}$ in the above example as an example:

$$\begin{cases} N_{type}(\mathrm{argmin}_j DI_n^{(m)}) + 1; & \text{if } \mathrm{min} DI_n^{(m)} \leq W_{th} \\ \text{The matching is invalid} & \text{otherwise} \end{cases} \qquad (23)$$

$N_{type}$ is a vector, which includes the number of times that each standard frame configuration is successfully matched which is obtained after the data of M frames has been utilized to perform the matching for M times. When the minimum element min $DI_n^{(m)}$ in the vector $DI_n^{(m)}$ is less than or equal to the threshold value $W_{th}$, it is considered that the corresponding frame configuration type is credible (that is, the corresponding element in $N_{type}$ will increase by one (which is indicated by $N_{type}$ (arg $\min_j DI_n^{(m)}$)+1 in the above formula)); otherwise, it is considered that the matching is invalid.

In addition, the following formula is obtained:

$$t_n\left(\operatorname{argmax}_j N_{type}\right) = 1 \quad (24)$$

Wherein $t_n$ indicates a vector, in which a position of an element which is "1" indicates the decision result of $n_{co}$ secondary users in an n-th group on the frame configuration type. As described above, assuming that $n_{id}$ secondary users participating in the detection are divided into $n_{id}$ groups, and each group includes $n_{co}$ secondary users ($n_d = n_{id}/n_{co}$), then decision results of the $n_d$ groups on the frame configuration type may be obtained, i.e., $n_d$ vectors $t_n$ ($1 \le n \le n_d$). These decision results may be further fused, and a final decision result may be obtained. For example, the final decision result may be calculated with the following formula:

$$T = \arg\left(\max_j \sum_{n=1}^{n_d} t_n\right) \quad (25)$$

Wherein T indicates the final decision result (i.e., the finally determined frame configuration type), that is, a frame configuration type that most frequently appears in the $n_d$ frame decision results is selected as the final frame configuration type.

In the following, taking the vector $\tilde{D}_n^{(m)}$ as an example, another specific example for utilizing determination results of multiple apparatuses in the secondary system to determine the uplink/downlink configuration type of the channel resource in the primary system is described.

$\tilde{D}_n^{(m)}$ adopts a soft information method, and the matching distance between $\tilde{D}_n^{(m)}$ and each row in the matrix C may be calculated with the following formula:

$$\widetilde{DI}_n^{(m)} = C\tilde{D}_n^{(m)T} \quad (26)$$

Wherein $\widetilde{DI}_n^{(m)}$ is a vector, and element values therein indicate the matching distances between the vector $\tilde{D}_n^{(m)}$ and respective standard frame configurations. It can be seen that, the more alike $\tilde{D}_n^{(m)}$ is to a frame configuration, the larger the corresponding element value in $\widetilde{DI}_n^{(m)}$ is. This is opposite to $\widetilde{DI}_n^{(m)}$ in the example described with reference to Formulas (21) and (22). Therefore, a standard configuration corresponding to an element with the maximum value in $\widetilde{DI}_n^{(m)}$ may be determined as the uplink/downlink configuration type of the channel resource in the primary system.

Optionally, it may also estimate whether a predetermined relationship is satisfied between the matching result obtained by the above Formula (26) and a predetermined threshold value (which is referred to as a seventh threshold value), if yes, then it is considered that a standard configuration corresponding to the matching result is the uplink/downlink configuration type of the channel resource in the primary system. For example, the following formula may be adopted:

$$\begin{cases} N_{type}(\operatorname{argmin}_j \widetilde{DI}_n^{(m)}) + 1; & \text{if } \max \widetilde{DI}_n^{(m)} \ge \tilde{W}_{th} \\ \text{The matching is invalid} & \text{others} \end{cases} \quad (27)$$

In the above formula, $N_{type}$ is a vector, which includes the number of times that each standard frame configuration is successfully matched which is obtained after the data of M frames has been utilized to perform the matching for M times. $\tilde{W}_h$ indicates the seventh threshold value, and if the maximum element value in $\tilde{D}_n^{(m)}$ is more than or equal to the threshold value, it is considered that the matching result is credible (i.e., the corresponding element in $N_{type}$ will increase by one (which is indicated by $N_{type}$(arg $\min_j \widetilde{DI}_n^{(m)}$)+1 in the above formula)); otherwise, it is considered that the matching is invalid.

Some implementations of an apparatus used in a cognitive radio communication system according to the disclosure will be described hereinafter.

Figure 10:
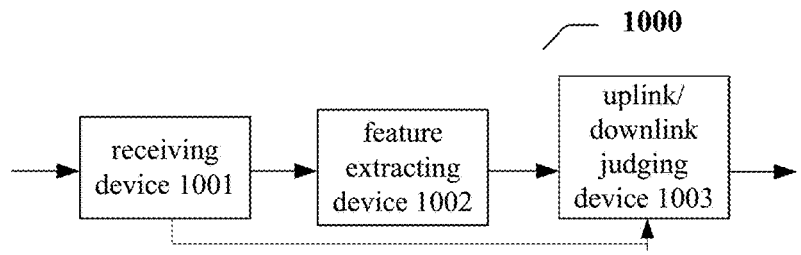
FIG. 10 is a schematic block diagram illustrating the structure of an apparatus used in a cognitive radio system according to an embodiment.

FIG. 10 is a schematic block diagram illustrating a structure of an apparatus used in a cognitive radio system according to an embodiment. As shown in FIG. 10, the apparatus 1000 may include a receiving device 1001, a feature extracting device 1002 and an uplink/downlink judging device 1003. The apparatus 1000 may detect an uplink/downlink configuration for a channel resource in a primary system with the methods in the embodiments or examples to described above with reference to FIG. 1 and so on.

Specifically, the receiving device 1001 may be used to receive a communication signal between respective apparatuses in the primary system, and provide the communication signal to the feature extracting device 1002.

The feature extracting device 1002 may be used to extract, from the communication signal received from the receiving device 1001, one or more features that can reflect a difference between an uplink transmission mode and a downlink transmission mode for the primary system, and provides the feature(s) to the uplink/downlink judging device 1003. The feature extracting device 1002 may extract the feature(s) with the methods in the embodiments or examples described above with reference to FIGS. 1 to 8. For example, the extracted features may include at least one of a feature reflecting transmission power of the communication signal, a feature reflecting a modulation mode for the communication signal, and a peak-to-average ratio of the communication signal.

The uplink/downlink judging device 1003 may be used to judge whether the channel resource occupied by the communication signal received by the receiving device 1001 is used for uplink transmission or downlink transmission, according to the feature(s) extracted by the feature extracting device 1002. The uplink/downlink judging device 1003 may perform the judging with the methods in the embodiments or examples described above with reference to FIGS. 1 to 8.

The apparatus 1000 described above with reference to FIG. 10 utilizes the communication signal received from the primary system to judge the uplink/downlink configuration for the channel resource in the primary system. There is no deed for the apparatus 1000 to perform information interaction with the primary system, therefore, there is no need for the primary system to change its system configurations, which can better meet the requirement that the secondary system is transparent to the primary system under the cognitive radio scenario.

The apparatus 1000 described above with reference to FIG. 10 may be equipped in a user apparatus (SU) in a cognitive radio system (which is also referred to as the secondary system), and may also be equipped in a base station (SBS) in the secondary system.

As a specific embodiment, the apparatus 1000 may adopt the method shown in FIG. 2. The feature extracting device 1002 may be configured to estimate an energy value of the communication signal received by the receiving device 1001 in the channel resource, as the feature capable of reflecting the difference between the uplink transmission mode and the downlink transmission mode for the primary system. The uplink/downlink judging device 1003 may be configured to judge whether a predetermined relationship is satisfied between the energy value estimated by the feature extracting device 1002 and a predetermined threshold value (such as the first threshold value described above), and if yes, then judge that the channel resource is used for the downlink transmission. Specifically, the uplink/downlink judging device 1003 may judge whether the estimated energy value is greater than the first threshold value, and if yes, then judge that the channel resource is used for the downlink transmission; otherwise, judge that the channel resource is used for the uplink transmission.

As an example, the first threshold value may be set according to the maximum uplink transmission power and the downlink transmission power of the primary system, which is not repeated here.

As another example, the uplink/downlink judging device 1003 may determine the first threshold value, for example, according to whether the secondary system can acquire relative position (such as distances between respective nodes) information of all transceivers (i.e., all nodes) in the primary system and the secondary system. For example, if the secondary system can know about the relative position information (i.e., a case that the relative positions between respective nodes can be located), the uplink/downlink judging device 1003 may estimate the accuracy of the uplink/downlink detection, and then accurately set the first threshold value according to the accuracy. Alternatively, if the secondary system can know about the relative position information (i.e., a case that the relative positions between respective nodes can be located), the uplink/downlink judging device 1003 may estimate a maximum value or a minimum value of the accuracy of the uplink/downlink detection, and calculate a feasible search interval of the first threshold value, and thereby search a suitable value within the search interval as the first threshold value. The uplink/downlink judging device 1003 may determine the first threshold value with the methods described above with reference to Formulas (A1) to (A10), which is not repeated here. When the secondary system can not know about the relative position information (i.e., a case that the relative positions between respective nodes can not be located), the uplink/downlink judging device 1003 may use a predetermined threshold value set according to the maximum uplink transmission power and the downlink transmission power of the primary system, as the first threshold value.

In the specific embodiment described above, the apparatus 1000 in the secondary system utilizes the difference between the uplink transmission power and the downlink transmission power of the primary system to judge the uplink/downlink configuration for the channel resource in the primary system. Except for the downlink transmission power and the maximum uplink transmission power of the primary system, there is no need for the secondary system to acquire other priori information about the primary system to judge the uplink/downlink configuration, which facilitates the deployment of the secondary system.

Optionally, after judging that the channel resource is used for the uplink transmission by utilizing the energy value estimated by the feature extracting device 1002, the uplink/downlink judging device 1003 in the apparatus 1000 may further judge whether the uplink channel resource is idle. For example, the judgment may be performed by utilizing the processing described above with reference to the dashed line block 208 in FIG. 2, i.e., utilizing two threshold values (the first threshold value and the second threshold value), which is not repeated here.

Figure 11:
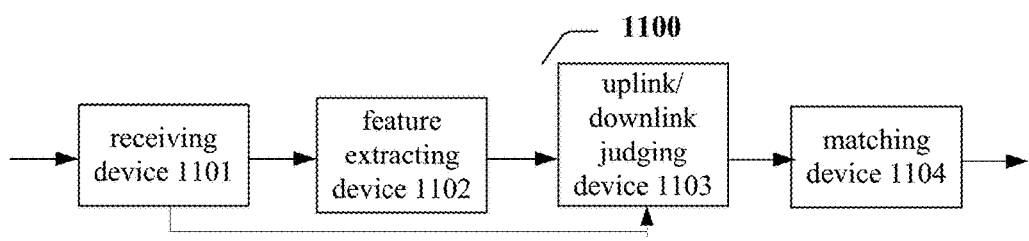
FIG. 11 is a schematic block diagram illustrating the structure of an apparatus used in a cognitive radio system according to another embodiment.

FIG. 11 is a schematic block diagram illustrating a structure of an apparatus 1100 for a cognitive radio communication system according to another specific embodiment. Similar to the apparatus 1000, the apparatus 1100 also includes a receiving device 1101, a feature extracting device 1102 and an uplink/downlink judging device 1103; however, the apparatus 1100 differs from the apparatus 1000 in that the apparatus 1100 further includes a matching device 1104.

Functions of the receiving device 1101, the feature extracting device 1102 and the uplink/downlink judging device 1103 are respectively similar to the functions of the receiving device 1001, the feature extracting device 1002 and the uplink/downlink judging device 1003 described above. The uplink/downlink configuration for the channel resource occupied by the communication signal of the primary system may be judged with the methods described above with reference to FIGS. 4 to 9, which is not repeated here.

The matching device 1104 may used to match the judgment result obtained by the uplink/downlink judging device 1103 with one or more standard configurations for the channel resource in the primary system, to determine the uplink/downlink configuration type of the channel resource in the primary system according to the matching result. The matching device 1104 may perform the matching with the methods in the embodiments or examples described above with reference to FIGS. 4 to 9. For example, the matching device 1104 may calculate a matching distance between the judgment result obtained by the uplink/downlink judging device 1103 and each standard configuration, and determine a standard configuration best matching the judgment result according to the matching distance, as the configuration type of the channel resource in the primary system (steps 410-1 and 410-2 shown in FIG. 6), which is not repeated here.

Similar to the apparatus 1000, the apparatus 1100 may also be configured in a user apparatus (SU) in a cognitive radio system (which is also referred to as the secondary system), and may also be configured in a base station (SBS) in the secondary system.

The apparatus 1100 in the secondary system may utilize priori knowledge about the standard configurations for the channel resource in the primary system to further optimize the judgment result on the uplink/downlink configuration for the channel resource in the primary system, thereby making the result more accurate. The priori knowledge may be, for example, stored in a storage device (which is not shown in the figure) associated with the apparatus 1100. The storage device may be a memory within the apparatus 1100, or may be an external storage device connected with the apparatus 1100 and accessible by the apparatus 1100.

In a specific embodiment, the apparatus 1000 or 1100 in the secondary system may utilize features extracted from multiple communication signals to judge whether the channel resource is used for the uplink transmission or the downlink transmission. Specifically, the receiving device 1001 or 1101 may receive multiple communication signals (such as multiple frames), and the feature extracting device 1002 or 1102 may repeatedly perform the processing in step 104 or 204 or 404 to extract the feature(s) described above from the multiple communication signals. The uplink/downlink judging device 1003 or 1103 may repeatedly perform the processing in step 106 or 206 or 406, and the matching device 1104 may repeatedly perform the processing in step 410. In this way, influence of a random error event on the matching result may be reduced in detecting each sub-frame, thereby making the obtained result on the uplink/downlink configuration for the channel resource more accurate.

The embodiment or example described above provides a cognitive radio communication system (a secondary system), in which the apparatus 1000 or 1100 is included, and the apparatus 1000 or 1100 is used to detect an uplink/downlink configuration for a channel resource in the primary system. The apparatus 1000 or 1100 may be a base station in the secondary system, or may also be a user apparatus in the secondary system. The apparatus 1000 or 1100 may send the judgment result to other apparatuses in the secondary system (for example, by utilizing a sending device (which is not shown in the figure) in the apparatus 1000 or 1100).

For example, if the apparatus 1000 or 1100 is a user apparatus in the secondary system, then the user apparatus may utilize a sending device thereof (which is not shown in the figure) to send the judgment result thereof to a base station in the secondary system, and the judgment result is distributed to other user apparatuses by the base station. Alternatively, the apparatus 1000 or 1100 may utilize a sending device thereof (which is not shown in the figure) to send the judgment result thereof to other user apparatuses. Further, if the apparatus 1000 or 1100 is a base station in the secondary system, then the base station may send the judgment result thereof to one or more user apparatuses in the secondary system.

In other embodiments, the cognitive radio communication system (the secondary system) may include multiple apparatuses 1000 or 1100, and utilize the multiple apparatuses to judge the uplink/downlink configuration for the channel resource in the primary system simultaneously. The multiple apparatuses may respectively utilize the sending device thereof (which is not shown in the figure) to send the judgment results thereof to one of the apparatuses, and these judgment results are fused by the apparatus. By utilizing the multiple apparatuses in the secondary system to cooperate, influence of the space distribution of a single apparatus on the accuracy of the detection result may be reduced, thereby making the obtained result on the uplink/downlink configuration for the channel resource more accurate.

In a specific embodiment, the receiving device (such as 1101) in an apparatus (such as 1100) in the secondary system may be further configured to receive determination results on the uplink/downlink configuration type of the channel resource in the primary system, from one or more other apparatuses (which is referred to as a second apparatus) in the secondary system (such as step 812). The matching device 1104 in the apparatus 1100 may be further configured to further determine the uplink/downlink configuration type of the channel resource in the primary system, according to multiple determination results from the apparatus and the other apparatuses (the second apparatuses) and one or more standard configurations for the channel resource in the primary system (such as the processing described with reference to step 816). The matching device 1104 may fuse the multiple determination results by adopting the method in the embodiment or the example described above with reference to FIG. 8 or 9, and finally determine the uplink/downlink configuration type of the channel resource in the primary system according to the fused result. For example, the matching device 1104 may be further configured to, before fusing the multiple determination results, estimate credibility of each determination result, and remove a determination result having low credibility (such as the processing in step 820). The matching device 1104 may perform the above operations with the methods described above, which is not repeated here.

In another specific embodiment, the receiving device (such as 1001 or 1101) in an apparatus (such as 1000 or 1100) in the secondary system may be further configured to receive judgment results about whether the channel resource occupied by the communication signal between respective apparatuses in the another radio communication system is used for the uplink transmission or the downlink transmission, from one or more other apparatuses (the second apparatuses) in the secondary system (such as the processing in step 712). The uplink/downlink judging device (such as 1003 or 1103) may be further configured to determine whether the channel resource occupied by the communication signal of the primary system is used for the uplink transmission or the downlink transmission, according to the multiple judgment results of the apparatus and the other apparatuses (the second apparatuses) (such as the processing described with reference to step 714). As a specific example, the uplink/downlink judging device (such as 1003 or 1103) may be further configured to, before fusing the multiple judgment results, estimate credibility of each judgment result, and remove a judgment result having low credibility (such as the processing in step 716). The uplink/downlink judging device (such as 1003 or 1103) may perform the above operations with the methods in the embodiments or examples described above, which is not repeated here.

As a specific embodiment, the feature extracting device (such as 1002 or 1102) may be further configured to extract synchronization information in the communication signal received by the receiving device (such as 1001 or 1101), to locate channel resources occupied by the communication signal. Reference can be made to the processing described above with reference to step 203, and it is not repeated here.

In the above embodiments and examples, expressions such as "first" and "second" are adopted. It should be understood by those skilled in the art that, the expressions are only used to distinguish terms literally, and do not indicate sequence or any other limitation.

It should be understood that, the above embodiments and examples are exemplary other than being exhaustive, and it should not consider that the disclosure is limited by any specific embodiment or example.

As an example, each step in the method used in the cognitive radio system described above and each composition module and/or unit in the above apparatus may be implemented in software, firmware, hardware or a combination thereof in the base station (SBS) or the user apparatus (SU) in the cognitive radio system, and the software, the firmware, the hardware or the combination thereof is used as a part of the base station or the user apparatus. When each composition module and/or unit in the above apparatus are configured with the software, the firmware, the hardware or the combination thereof, specific available methods or ways are well known for those skilled in the art, which IS not repeated here. As an example, the method and/or the apparatus according to the disclosure may be implemented in an existing base station or an existing user apparatus, as long as some modifications are made to each component in the existing base station or the existing user apparatus.

As an example, in a case where it is implemented with the software or the firmware, programs consisting of the software for implementing the above method may be mounted, from a storage medium or network, onto a computer (such as the general purpose computer 1200 shown in FIG. 12) having a dedicated hardware structure. When various programs are mounted, the computer can perform various functions.

Figure 12:
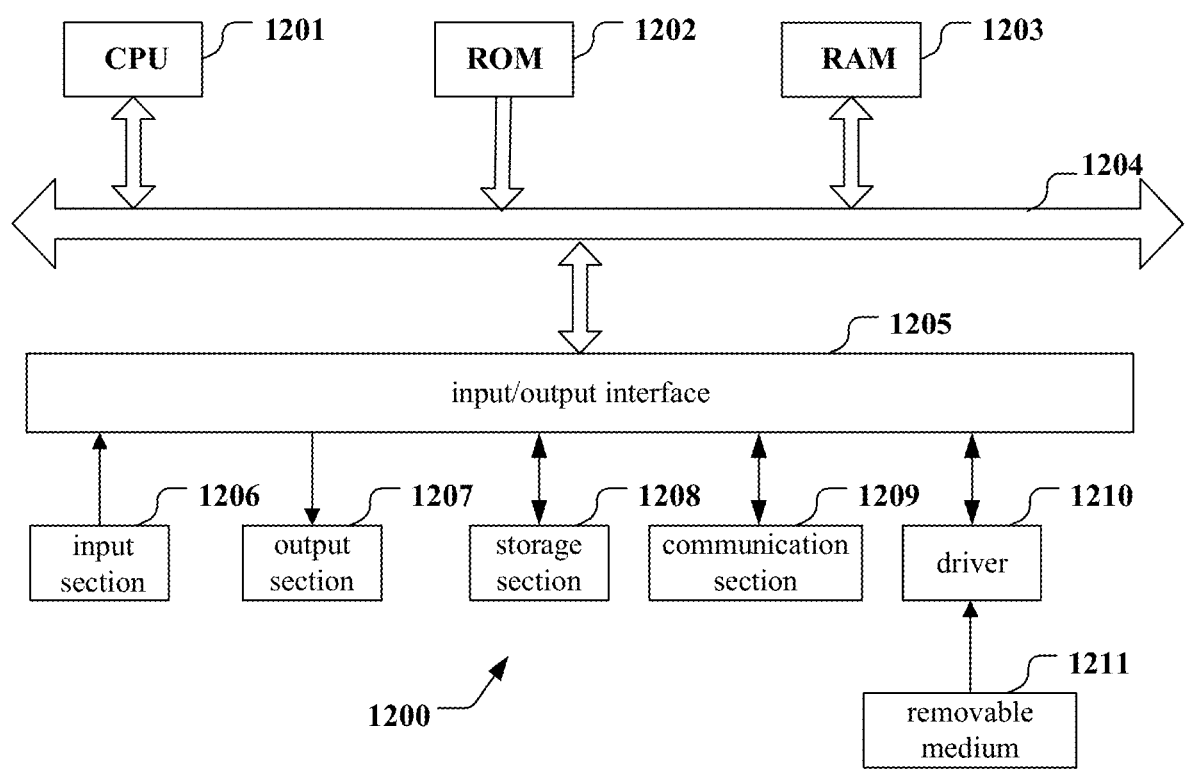
FIG. 12 is a schematic block diagram illustrating the structure of a computer for implementing an embodiment or an example of the disclosure.

In FIG. 12, a central processing unit (CPU) 1201 performs various processing according to a program stored in a read only memory (ROM) 1202 or a program loaded from a storage section 1208 to a random access memory (RAM) 1203. In the RAM 1203, data required when the CPU 1201 performs various processing is also stored as necessary. The CPU 1201, the ROM 1202 and the RAM 1203 are connected with each other via bus 1204. An input/output interface 1205 is also connected to the bus 1204.

The following components are linked to the input/output interface 1205: an input section 1206 (including a keyboard, a mouse and the like), an output section 1207 (including a display such as a cathode-ray tube (CRT) and a liquid crystal display (LCD), a speaker and the like), a storage section 1208 (including a hard disk and the like) and a communication section 1209 (including a network interface card such as a LAN card, a modem and the like). The communication section 1209 performs communication processing via a network such as internet. A driver 1201 may also be linked to the input/output interface 1205 as necessary. A removable medium 1211, such as a magnetic disk, an optical disk, a magneto-optical disk and a semiconductor memory, may be mounted onto the driver 1210 as necessary, so that a computer program read from the removable medium 1211 may be mounted into the storage section 1208 as necessary.

In a case where a series of processing described above is implemented by the software, programs consisting of the software may be amounted from a network such as internet or a storage medium such as the removable medium 1211.

It should be understood by those skilled in the art that, the storage medium is not limited to the removable medium 1211 shown in FIG. 12 which stores a program therein and distributes the program separately from the apparatus to provide the program to the user. An example of the removable medium 1211 includes a magnetic disk (including a floppy disk (registered mark)), an optical disk (including a compact disc read only memory (CD-ROM) and a digital versatile disk (DVD)), a magneto-optical disk (including a mini disk (MD) (registered mark)) and a semiconductor memory. Alternatively, the storage medium may be a hard disk included in the ROM 1202 or the storage section 1208 and the like, which stores a program therein and is distributed to the user together with the apparatus in which the storage medium is included.

The disclosure further provides a program product with a machine readable instruction code stored thereon. The instruction code, when being read and performed by a machine, may perform the above methods according to the embodiments of the disclosure.

Accordingly, a storage medium used to carry the above program product with a machine readable instruction code stored thereon is also included in the disclosure. The storage medium includes, but is not limited to, a floppy disk, an optical disk, a magneto-optical disk, a memory card, a memory stick and the like.

In the above description of the specific embodiments of the disclosure, features described and/or illustrated for one embodiment may be used in one or more other embodiments in a same or similar way, combined with features in other embodiments, or substitute features in other embodiments.

It should be emphasized that, term "comprise/include", when used herein, indicates the presence of a feature, an element, a step or a component, which does not exclude the presence or addition of one or more other features, elements, steps or components.

In addition, the method in the disclosure is not limited to be performed in the time sequence described in the specification, and may be performed in other time sequences, in parallel or independently. Therefore, the execution sequence of the method described in the specification should not be considered as limiting the technical scope of the disclosure.

Although the disclosure has been disclosed above by the description of the specific embodiments of the disclosure, it should be understood that, all of the above embodiments and examples are exemplary rather than being restrictive. Various modifications, improvements or equivalents to the disclosure may be designed by those skilled in the art without deviation from the spirit and scope of the appended claims. It should be understood that, these modifications, improvements or equivalents are also within the scope of protection of the disclosure.

The invention claimed is:

1. An electronic device, comprising
circuitry configured to
detect an energy value of a signal by sensing target transmission resources to be used by the electronic device;
determine an occupancy probability of the target transmission resources based on the energy value and a threshold; and
generate a report, that indicates the occupancy probability, for another device that controls utilization of the target transmission resources by the electronic device, wherein
an occupancy status of the target transmission resources corresponds to one of downlink transmission occupied, uplink transmission occupied or idle, and
the circuitry is further configured to distinguish between a downlink transmission occupied status and an uplink transmission occupied status based on whether the energy value exceeds a second threshold.

2. The electronic device according to claim 1, wherein the circuitry is further configured to detect plural energy values of one or more samples on the target transmission resources, and
the report is based on the plural energy values.

3. The electronic device according to claim 1, wherein the circuitry is configured to determine that the target transmission resources are occupied in a case that the detected energy value exceeds the threshold.

4. The electronic device according to claim 1, wherein the circuitry is configured to detect the energy value on the target transmission resources according to an energy of a communication signal received on the target transmission resources.

5. The electronic device according to claim 1, wherein the second threshold is set according to a maximum uplink transmission power and a downlink transmission power.

6. The electronic device according to claim 1, wherein the circuitry is further configured to
receive a signal on the target transmission resources, and
perform a Fourier Transform on the signal to acquire a sample of which the energy value is detected.

7. The electronic device according to claim 1, wherein the circuitry is configured to detect energy values of a predetermined number of symbols.

8. The electronic device according to claim 1, wherein the another device is a base station that determines, based on the report, a candidate configuration of additional target transmission resources of another communication system as a basis of controlling interference to the another communication system.

9. A method for radio communication in a radio communication system, the method comprising:
detecting, by an electronic device, an energy value of a signal by sensing target transmission resources to be used by the electronic device;
determining an occupancy probability of the target transmission resources based on the energy value and a threshold; and
generating a report, that indicates the occupancy probability, for another device that controls utilization of the target transmission resources by the electronic device, wherein
an occupancy status of the target transmission resources corresponds to one of downlink transmission occupied, uplink transmission occupied or idle, and
the method further comprises distinguishing between a downlink transmission occupied status and an uplink transmission occupied status based on whether the energy value exceeds a second threshold.

10. The method according to claim 9, further comprising:
detecting plural energy values of one or more samples on the target transmission resources, wherein
the report is based on the plural energy values.

11. The method according to claim 9, further comprising:
determining that the target transmission resources is occupied in a case that the detected energy value exceeds the threshold.

12. The method according to claim 9, wherein the detecting the energy value on the target transmission resources is performed according to an energy of a communication signal received on the target transmission resources.

13. The method according to claim 9, wherein the second threshold is set according to a maximum uplink transmission power and a downlink transmission power.

14. The method according to claim 9, further comprising:
receiving a signal on the target transmission resources; and
performing a Fourier Transform on the signal to acquire a sample of which the energy value is detected.

15. The method according to claim 9, further comprising:
detecting energy values of a predetermined number of symbols.

16. The method according to claim 9, wherein the another device is a base station that determines, based on the report, a candidate configuration of target transmission resources of another communication system as a basis of controlling interference to the another communication system.

17. A non-transitory computer readable storage medium including executable instructions, which when executed by an electronic device, cause the electronic device to:
detect an energy value of a signal by sensing target transmission resources to be used by the electronic device;
determine an occupancy probability of the target transmission resources based on the energy value and a threshold; and
generate a report, that indicates the occupancy probability, for another device that controls utilization of the target transmission resources by the electronic device, wherein
an occupancy status of the target transmission resources corresponds to one of downlink transmission occupied, uplink transmission occupied or idle, and
the electronic device is further caused to distinguish between a downlink transmission occupied status and an uplink transmission occupied status based on whether the energy value exceeds a second threshold.

18. The non-transitory computer readable storage medium according to claim 17, wherein
the electronic device is further caused to detect plural energy values of one or more samples on the target transmission resources, and
the report is based on the plural energy values.

* * * * *